United States Patent
Choksi et al.

(10) Patent No.: US 10,067,988 B2
(45) Date of Patent: Sep. 4, 2018

(54) USER-BASED CONTENT FILTERING AND RANKING TO FACILITATE ON-DEMAND SERVICES

(71) Applicant: Uber Technologies, Inc., San Francisco, CA (US)

(72) Inventors: Maya Paritosh Choksi, San Francisco, CA (US); Molly Nix, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/208,963

(22) Filed: Jul. 13, 2016

(65) Prior Publication Data

US 2017/0024393 A1    Jan. 26, 2017

Related U.S. Application Data

(60) Provisional application No. 62/195,217, filed on Jul. 21, 2015.

(51) Int. Cl.
*G06F 17/30* (2006.01)
*G06Q 40/00* (2012.01)
(Continued)

(52) U.S. Cl.
CPC ........ *G06F 17/3053* (2013.01); *G06F 3/0485* (2013.01); *G06F 17/30554* (2013.01); *G06Q 40/12* (2013.12); *G08G 1/127* (2013.01)

(58) Field of Classification Search
CPC .......... G06F 17/3087; G06F 17/30554; G06F 17/3053
See application file for complete search history.

(56) References Cited

U.S. PATENT DOCUMENTS 6,424,910 B1   7/2002   Ohler
6,574,551 B1   6/2003   Maxwell
(Continued)

FOREIGN PATENT DOCUMENTS

JP    H 09153098 A    11/1995
JP    2007249918        9/2007
(Continued)

OTHER PUBLICATIONS

International Search Report in related PCT/US2015/021227 dated Jun. 18, 2015.
(Continued)

*Primary Examiner* — Jean M Corrielus
(74) *Attorney, Agent, or Firm* — Mahamedi IP Law LLP

(57) ABSTRACT

A transport facilitation system can receive content items for display on driver devices associated with an on-demand transportation service. Using stored driver data for a driver, the system can filter the content items into a filtered subset of content items relevant to the driver. The system can receive location data from a driver device indicating a current location of the driver as the driver travels throughout a given region, and determine a degree of relevance for each of the filtered subset of content items based, at least in part, on the current location of the driver. The system can generate a set of ranked content items for display on the driver device based on the determined degree of relevance for each of the filtered subset of content items, and provide the set of ranked content items for display on the driver device.

15 Claims, 10 Drawing Sheets

(51) Int. Cl.
   *G06F 3/0485*   (2013.01)
   *G08G 1/127*   (2006.01)

(56) References Cited

U.S. PATENT DOCUMENTS

| | | | |
|---|---|---|---|
| 6,718,551 B1 | 4/2004 | Swix | |
| 6,978,470 B2 | 12/2005 | Swix | |
| 7,086,075 B2 | 8/2006 | Swix | |
| 7,212,979 B1 | 5/2007 | Matz | |
| 7,783,516 B2 | 8/2010 | Stoffelsma et al. | |
| 7,827,104 B2 | 11/2010 | Posabella et al. | |
| 7,917,153 B2 | 3/2011 | Orwant et al. | |
| 7,930,098 B2 | 4/2011 | Huang | |
| 7,945,566 B2 * | 5/2011 | James | G06F 17/30528 707/723 |
| 7,992,161 B2 | 8/2011 | Meadows | |
| 8,086,491 B1 | 12/2011 | Matz | |
| 8,103,576 B2 | 1/2012 | Farrell et al. | |
| 6,356,838 B1 | 3/2012 | Paul | |
| 8,311,560 B2 | 11/2012 | Kong | |
| 8,311,875 B1 * | 11/2012 | Lloyd | G06Q 30/0241 705/7.29 |
| 8,538,374 B1 | 9/2013 | Haimo et al. | |
| 8,554,608 B1 | 10/2013 | O'Connor | |
| 8,624,727 B2 | 1/2014 | Saigh et al. | |
| 8,719,391 B2 | 5/2014 | Hamalainen et al. | |
| 8,738,292 B1 | 5/2014 | Faaborg | |
| 8,768,294 B2 | 7/2014 | Reitnour et al. | |
| 8,855,916 B2 | 10/2014 | Meredith et al. | |
| 8,989,773 B2 | 3/2015 | Sandel | |
| 9,066,206 B2 | 6/2015 | Lin | |
| 9,426,528 B2 * | 8/2016 | Kandanala | G06Q 30/0269 |
| 9,485,647 B2 * | 11/2016 | Mohebbi | H04W 8/06 |
| 2002/0138338 A1 * | 9/2002 | Trauth | G06Q 10/06311 705/7.13 |
| 2002/0143587 A1 | 10/2002 | Champernown | |
| 2003/0061179 A1 | 3/2003 | Reece | |
| 2003/0084125 A1 | 5/2003 | Nagda et al. | |
| 2004/0219933 A1 | 11/2004 | Faith | |
| 2005/0229219 A1 | 10/2005 | Posabella et al. | |
| 2006/0034201 A1 | 2/2006 | Umeda et al. | |
| 2006/0056023 A1 * | 3/2006 | Malfait | G02B 26/02 359/472 |
| 2006/0059023 A1 * | 3/2006 | Mashinsky | G06Q 10/02 705/5 |
| 2006/0116965 A1 | 6/2006 | Kudo | |
| 2006/0235739 A1 | 10/2006 | Levis et al. | |
| 2006/0276960 A1 * | 12/2006 | Adamczyk | G01C 21/00 701/516 |
| 2007/0093247 A1 | 4/2007 | Yaqub | |
| 2007/0244730 A1 | 10/2007 | Johnson | |
| 2008/0046356 A1 | 2/2008 | Farrell et al. | |
| 2008/0195428 A1 | 2/2008 | O'Sullivan | |
| 2008/0114629 A1 | 5/2008 | Pavlov | |
| 2008/0122691 A1 | 5/2008 | Carani et al. | |
| 2009/0030749 A1 | 1/2009 | Drummond et al. | |
| 2009/0037194 A1 | 2/2009 | Roche | |
| 2009/0063464 A1 * | 3/2009 | Chang | G06F 17/30864 |
| 2009/0176508 A1 | 7/2009 | Lubeck | |
| 2009/0248587 A1 * | 10/2009 | Van Buskirk | G06Q 50/188 705/80 |
| 2009/0281844 A1 | 11/2009 | Probst | |
| 2010/0023376 A1 | 1/2010 | Brown | |
| 2010/0042549 A1 * | 2/2010 | Adamczyk | G01C 21/00 705/80 |
| 2010/0153279 A1 * | 6/2010 | Zahn | G06Q 10/02 705/80 |
| 2010/0241349 A1 | 9/2010 | Wu | |
| 2010/0280852 A1 | 11/2010 | Huang | |
| 2010/0293030 A1 | 11/2010 | Wu | |
| 2011/0099040 A1 * | 4/2011 | Felt | G06F 17/3087 705/7.12 |
| 2011/0112768 A1 | 5/2011 | Doyle | |
| 2011/0113148 A1 | 5/2011 | Salmela | |
| 2011/0131238 A1 | 6/2011 | Peeters et al. | |
| 2011/0136468 A1 | 6/2011 | McNamara et al. | |
| 2011/0231493 A1 | 9/2011 | Dyor | |
| 2011/0296463 A1 * | 12/2011 | Suslov | G06F 17/3053 725/44 |
| 2012/0032974 A1 | 2/2012 | Lynch | |
| 2012/0041675 A1 | 2/2012 | Juliver et al. | |
| 2012/0046110 A1 | 2/2012 | Amaitis et al. | |
| 2012/0089974 A1 | 4/2012 | Cho | |
| 2012/0101651 A1 | 4/2012 | Haynes | |
| 2012/0149312 A1 | 6/2012 | Velusamy | |
| 2012/0150436 A1 | 6/2012 | Rossano | |
| 2012/0200411 A1 | 8/2012 | Best | |
| 2012/0215594 A1 | 8/2012 | Gravelle | |
| 2012/0232791 A1 | 9/2012 | Sterkel | |
| 2012/0232943 A1 | 9/2012 | Myr | |
| 2012/0323627 A1 * | 12/2012 | Herring, Jr. | G06Q 30/02 705/7.29 |
| 2012/0323642 A1 | 12/2012 | Camp et al. | |
| 2013/0030871 A1 | 1/2013 | Schwitzky | |
| 2013/0090959 A1 | 4/2013 | Kvamme | |
| 2013/0132140 A1 | 5/2013 | Amin | |
| 2013/0144831 A1 | 6/2013 | Atlas | |
| 2013/0246207 A1 | 9/2013 | Novak et al. | |
| 2013/0246301 A1 | 9/2013 | Radhakrishnan | |
| 2013/0282602 A1 | 10/2013 | Wang | |
| 2013/0290110 A1 * | 10/2013 | LuVogt | G06Q 30/02 705/14.66 |
| 2013/0297674 A1 | 11/2013 | Jain | |
| 2013/0310053 A1 | 11/2013 | Srivastava et al. | |
| 2013/0325319 A1 | 12/2013 | Moore | |
| 2013/0339076 A1 | 12/2013 | Baranda | |
| 2013/0345980 A1 | 12/2013 | van Os | |
| 2014/0026065 A1 * | 1/2014 | Wang | G06Q 50/30 715/744 |
| 2014/0040079 A1 | 2/2014 | Smirin | |
| 2014/0066090 A1 | 3/2014 | Henderson | |
| 2014/0215330 A1 | 7/2014 | Lee | |
| 2014/0229258 A1 | 8/2014 | Serian | |
| 2014/0257681 A1 | 9/2014 | Kummamuru et al. | |
| 2014/0297178 A1 | 10/2014 | Luan | |
| 2014/0378118 A1 * | 12/2014 | Mohebbi | H04W 8/06 455/419 |
| 2015/0031388 A1 | 1/2015 | Chatterjee et al. | |
| 2015/0148060 A1 | 5/2015 | Parab et al. | |
| 2015/0241239 A1 | 8/2015 | van Dok | |
| 2015/0279216 A1 | 10/2015 | Ghanma | |
| 2016/0073223 A1 | 3/2016 | Woolsey | |
| 2016/0082581 A1 * | 3/2016 | Lai | G02B 7/1822 359/882 |
| 2016/0196269 A1 * | 7/2016 | Suslov | G06F 17/3053 707/725 |
| 2016/0356615 A1 | 12/2016 | Arata | |
| 2016/0364679 A1 * | 12/2016 | Cao | G06Q 50/30 |
| 2016/0364812 A1 * | 12/2016 | Cao | G06Q 50/30 |

FOREIGN PATENT DOCUMENTS

| | | |
|---|---|---|
| JP | 2009-146300 | 7/2009 |
| JP | 2011108194 | 6/2011 |
| KR | 2005/0119239 A | 12/2005 |
| KR | 2008/0044606 A | 5/2008 |
| KR | 10-2011-0061568 | 6/2011 |
| KR | 2011/0061414 A | 6/2011 |
| WO | WO 2003/040972 | 5/2005 |
| WO | WO 2010-123075 | 10/2010 |
| WO | WO 2011/067741 | 6/2011 |
| WO | WO 2013-166216 | 11/2013 |
| WO | WO 2014-000141 | 1/2014 |
| WO | WO 2014/074407 | 5/2015 |

OTHER PUBLICATIONS

Hai Yang et al. "Equilibria of bilateral taxi-customer searching and meeting on networks", Transportation Research Part B., 2010, vol. 44, pp. 1067-1083.

(56) References Cited

OTHER PUBLICATIONS

International Search Report and the Written Opinion as issued in PCT/US2013/048257, dated Oct. 22, 2013.
International Preliminary Report on Patentability as issued in PCT/US2013/048257 dated Jan. 15, 2015.
International Search Report and the Written Opinion as issued in PCT/US2016/012688, dated Apr. 28, 2016.
Computerworld article, "Need a ride? 3 Ridesharing and 2 taxi apps considered", Jan. 9, 2015, 17 pages, downloaded from http://www.computerworld.com/article/2863379/need-a-ride-3-ridesharing-and-2-taxi-apps-considered.html.
ApproachMe Google Play app web page, Updated May 27, 2016, 5 pages, downloaded from: https://play.google.com/store/apps/details?id=com.approachme.approachme&hl=en.
International Search Report in PCT/US2016/043017 dated Oct. 27, 2016.

* cited by examiner

USER-BASED CONTENT FILTERING AND RANKING TO FACILITATE ON-DEMAND SERVICES

CROSS REFERENCE TO RELATED APPLICATION

This application claims the benefit of priority to U.S. Provisional Application No. 62/195,217, entitled "USER-BASED CONTENT FILTERING AND RANKING TO FACILITATE ON-DEMAND SERVICES," filed Jul. 21, 2015, hereby incorporated by reference in its entirety.

BACKGROUND

On-demand services exist in various forms, including transportation and location-dependent services. The use of location-aware mobile computing devices facilitates the use and promotion of such services.

DETAILED DESCRIPTION

Figure 1A:
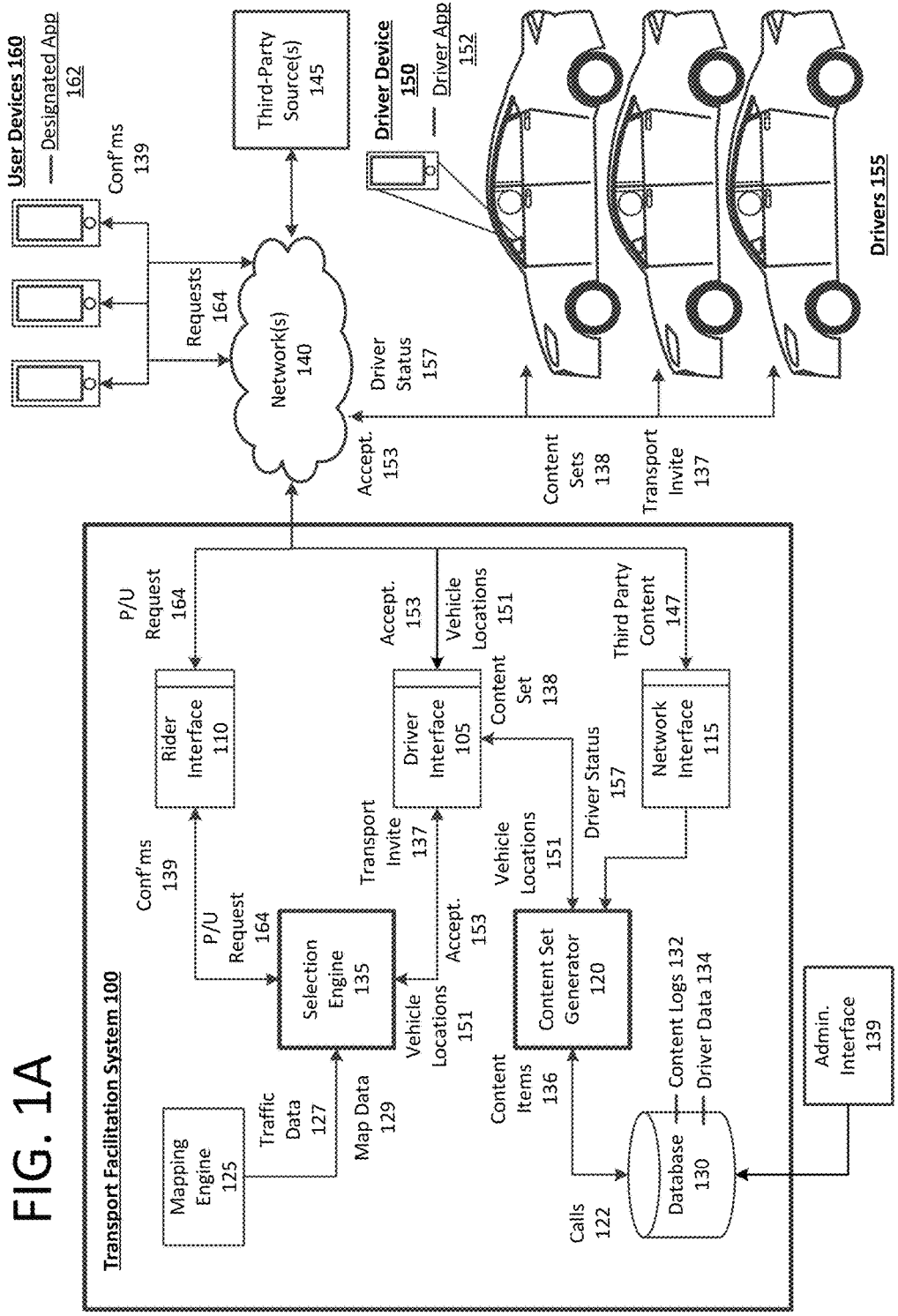
FIG. 1A is a block diagram illustrating an example transport facilitation system in communication with user and driver devices, as described herein.

Examples described herein provide for a system to provide service-oriented content that is custom tailored for individual providers of an on-demand service. The tailored content delivered to each service provider is filtered and ranked for that particular provider, thus enabling service providers (e.g., drivers providing ride-sharing services) to provide more efficient services and/or increase business. For example, a transport facilitation system that manages a transportation service throughout a given region—linking available drivers with requesting riders—can include a content filtering and ranking system that provides individualized content items to individual drivers based on a variety of factors. Such factors can include the current or dynamic location of the driver, a direction or route in which the driver travels, events or other occurrences that may affect transportation demand in an area in which the driver is operating, the driver's personal preferences and/or attributes, individualized information associated with the driver (e.g., monetary earnings, number of rides, scheduling information, milestones, and/or incentives for a given time period), and/or other data associated with the driver or driver device.

Among other benefits and advantages, a "content set generator," as described herein, can prioritize selected content, which can be generated from a notification platform and/or from multiple sources, based on relevancy to the individual driver. The determinations of relevance and/or priority of selected content can assist in determining whether a particular notification is displayed prominently, removed from display or viewing queue, or otherwise automatically acted upon. The determinations of relevance and priority can further be based in part on contextual, user-specific information. For example, in the context of transport services and drivers or transport providers, the context can include driver-specific information (including historical driver data), current location, trip or driver status, and/or future trip location. In this way, examples as described can control the manner in which notifications are displayed to the driver, so as to optimize display screen usage (e.g., "glance time") for relevance and importance of the information that is to be displayed. Moreover, the determinations of what content is to be displayed to the driver can be made with rules and parameters which are outside of the control of the driver, so that relevance and prioritization are determined with respect to objectives or requirements of a third party (e.g., a service provider).

According to some examples, a content set generator of the on-demand transport facilitation service can receive service-oriented content from one or more content sources associated with the on-demand transportation service. The service-oriented content may include financial, geographical, and/or social media content designed to aid, promote, or otherwise incentivize drivers to perform business-related activities associated with the on-demand transportation service. The content set generator can also receive driver data from the mobile computing devices of those drivers, and filter and rank a set of content items to be displayed on the driver's mobile computing device based on the driver data. For example, the driver data may be generated by a service application on the driver's mobile computing device, and may include position information for the driver. The content generator can determine a degree of relevance for each of the filtered the content items for the driver relative to other drivers of the on-demand transportation service. The content generator can then rank each content item in the filtered set based at least in part on the degree of relevance of that content item and provide the first set of content items, together with the associated ranking information, to the driver's mobile computing device. As the driver operates throughout the given region, the content set generator can continuously perform the filtering and ranking process in order to provide the driver's computing device with dynamically updated content.

In some examples, the content generator may assign a higher rank to content items that are more relevant to the driver than to other drivers of the on-demand transportation service. On the other hand, the content generator may assign a lower rank to content items that are at least equally relevant to a threshold number of other drivers of the on-demand transportation service. Still further, the content generator may rank each content item in the first set based at least in part on a degree to which the content item incentivizes the driver to perform activities related to the on-demand transportation service (e.g., driver to a certain location in which rider demand increases are imminent).

The service-oriented content delivered to each driver may be dynamically updated. For example, each content item displayed on the driver's device may be given an expiration based on a threshold duration of time, driver activity, or other expiration trigger detected by the service application (e.g., a driver application specific to receiving invitations from a backend transportation facilitation system to transport requesting users to specified destinations). When the expiration of a particular content item is triggered, that content item may then be removed from the driver's mobile computing device. This may help prevent the content displayed on the driver's mobile computing device from becoming stale or diluted.

As described herein, a "user," a "requester," "a requesting user," a "rider," or a "customer" are invariably used to refer to individuals that are requesting or ordering a service (e.g., requesting transportation in connection with an on-demand transportation facilitation service). Also as described herein, a "driver," a "provider," a "service provider," a "supplier," or a "vendor" are invariably used to refer to individuals or entities that can provide the service (e.g., a driver operating a vehicle to service pick-up requests in connection with the on-demand transportation facilitation service). As an example, a user can request a service, such as a transportation or delivery service (e.g., food delivery, messenger service, food truck service, or product shipping) or an entertainment service (e.g., mariachi band, string quartet) using the system, and a service provider, such as a driver, food provider, band, etc. can communicate with the system and/or the user to arrange for the service. In addition, as described herein, "requesting devices" (e.g., user devices) and "provider devices" (e.g., driver devices) refer to computing devices that can correspond to desktop computers, cellular or smartphones, laptop computers, tablet devices, television (IP Television), etc., that can provide network connectivity and processing resources for enabling a user to communicate with a system over a network. A provider device can also correspond to customized devices associated with a vehicle, such as an on-board computing system of the vehicle.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1A is a block diagram illustrating an example transport facilitation system in communication with user and driver devices, as described herein. The transport facilitation system 100 (or "transport system 100") can include a rider interface 110 in communication with user devices 160 executing a designated rider application 162 over one or more networks 140. The transport system 100 can further include a driver interface 105 to communicate with any number of drivers 155 operating throughout a given region (e.g., a metropolitan area such as New York City or the San Francisco Bay Area). In some aspects, the transport system 100 can communicate with human drivers of such vehicles over the network(s) 140 via the drivers' devices 150 (e.g., mobile computing devices executing a designated driver application 152). Additionally or alternatively, the transport system 100 can communicate with any number of self-driving vehicles (SDVs) (not shown) operating throughout the given region to service pick-up requests 164.

According to examples described herein, a user of a particular user device 160 can input user requests 164 in connection with the transportation arrangement service managed by the transport system 100. Such user requests 164 can be in the form of an on-demand pick-up request 164, indicating that the user wishes to request immediate or near-immediate pick-up. The pick-up request 164 can include a pick-up location, which the transport system 100 can utilize to service the pick-up request 164.

Specifically, the transport system 100 can include a selection engine 135 which can process the pick-up request 164 to determine a set of proximate available vehicles utilizing the pick-up location and the locations of vehicles 151 operating throughout the given region. The selection engine 135 can receive the vehicle locations 151 utilizing the location based resources (e.g., GPS resources) of the driver devices 150. Thus, for on-demand ride services, the transport system 100 can determine a set of proximate drivers (available and/or unavailable) in relation to the pick-up location included in the pick-up request 164, and generate and transmit transport invitations or directives 137 to optimal drivers or SDVs (e.g., a closest driver or driver having a shortest ETA in relation to the pick-up location). As described herein, the driver can input an acceptance 153 of the transport invitation 137 via the designated driver application 152 and thus drive to the pick-up location to rendezvous with the requesting user. For SDV implementations, the transport invitation 137 may be in the form of a directive instructing the SDV to autonomously drive to the pick-up location to rendezvous with the requesting user.

In various implementations, the driver application 152 can further indicate a driver status 157, which can provide the transport system 100 with information indicating whether the driver is available, off-duty, or busy currently servicing a pick-up request 164. The driver status 157 can be inputted by the driver 155 or can be automatically updated by the driver application 152 when the driver inputs an acceptance 153 or makes a passenger drop-off.

As provided herein, the transport system 100 can manage several different ride service types, such as a peer-to-peer ride service option, a ride pool service option, a luxury ride service option, a large vehicle ride service option, a professional ride service option, and the like. In submitting the on-demand pick-up request 164, the user can further specify a ride service type, which the selection engine 135 can utilize as a filter for the received vehicle locations 151. In some examples, the user can scroll through the different ride types on the designated rider application 162. The transport system 100 can provide dynamic ETA data to the user device 160 indicating an estimated time of arrival for one or more available vehicles of that particular type. For example, the vehicle locations 151 can filterable by the selection engine 135 based on the vehicle type and/or service type for which the vehicle is qualified. Along these lines, the selection engine 135 can utilize map data 129 and/or traffic data 127 from a mapping engine 125, and the vehicle locations 151 of the various drivers 155 operating throughout the given region, to provide the user with the ETA data for each scrolled service type. Thus, if a pick-up request 164 indicates a service type, the selection engine 135 can filter through the drivers 155 proximate to the pick-up location in order to transmit one or more transport invitations or directives 137 to only those drivers 155 that satisfy the characteristics of the specified service type.

According to examples provided herein, the transport system 100 can include a content set generator 120 that can dynamically provide and update a ranked set of content items 136 for each of the driver devices 150 as the drivers 155 operate throughout the given region. The content set generator 120 can utilize content items stored locally in a database 130, or from third party resources 145 which the content set generator 120 can access via a network interface 115 over one or more networks 140. In certain aspects, the transport system 100 can provide an administrator interface 139 to enable backend human administrators to create individual content items relevant to certain drivers 155 operating throughout the given region. For example, human administrators can utilize the administrator interface 139 to generate a particular content item with certain metadata tags, which the content set generator 120 can organize and store in content logs 132 of the database 130. In some aspects, the tags can indicate a particular location and time of a ride demand source, or future ride demand source, such as a sporting event or concert. In variations, the tags can indicate criteria that need to be met by the driver in order to receive the content item. The content set generator 120 can utilize the metadata tags to filter the content items 136 in the content logs 132 in light of the vehicle locations 151 of drivers 155 and/or the driver status 157.

In various implementations, the network interface 115 enables access to a number of third party resources 145, such as websites, event calendars for the given region, weather forecasting resources, public works resources indicating road construction, calendar resources (e.g., indicating holidays), airport or airline calendars indicating saturated flight periods, and other third-party sources that can indicate localized traffic and future demand for ride services for certain sub-regions throughout the given region. In receiving the third-party content 147, the content set generator 120 can automatically create content items, organize the content items using metadata tags (e.g., by time, location, expected impact on rider demand, and the like), and store the content items in the content logs 132 for use in generating content sets 138 to transmit to the driver devices 150.

In certain implementations, the transport system 100 can further store driver data 134 indicating driver preferences and attributes that can be inputted by the driver 155, or can be learned by the transport system 100 over time. For example, historical data for a particular driver can indicate a propensity towards traveling along certain routes or locations (e.g., an airport or sporting facility). Thus, the driver data 134 can indicate favored routes, areas, specific locations, and/or pricing conditions for each individual driver 155. The content set generator 120 can utilize the driver data 134, the metadata tags of content items in the content logs 132, and the current vehicle locations 151 of drivers 155 in order to filter and rank content items 136, and ultimately generate a dynamically updated content set 138 for display on the driver device 150. As provided herein, the content set 138 can update dynamically as the driver 155 drives throughout the given region. The updates can be triggered by the location 151 of the driver 155 (e.g., the driver passing outside a geo-fence associated with a content item), changes in the driver status 157, by an expiration time, and/or by updates in rider demand.

As drivers 155 operate throughout the given region, the content set generator 120 can monitor the vehicle locations 151 using the location-based resources of the driver devices 150, and make data calls 122 to the content logs 132 for content items 136 pertaining to the vehicle locations 151. Thus, the vehicle location 151 can comprise an initial filter for what can ultimately encompass an immense database of content items in the content logs 132. Additionally or alternatively, the content set generator 120 can utilize stored driver data 134 as filters for the content items in the content logs 132, as described herein. The data calls 122 can cause the database 130 to provide a filtered set of content items 136 to the content set generator 120 based on the current location of a particular vehicle.

An additional filter can comprise the driver status 157. For example, it is contemplated that the display of the driver device 150 may require mapping and/or routing data while the driver 155 is currently servicing a pick-up request 164. Thus, the content set generator 120 can refrain from transmitting content sets 138, or can only transmitted a limited set of content items while the driver status 157 indicates that the driver 155 is currently en route to a destination (e.g., to partially overlay map content on the driver device 150). Conversely, a driver 155 may be parked or driving with an available status. This available driver status 157 can trigger the content set generator 120 to dynamically present filtered and ranked content sets 138 on the display screen of the driver device 150.

As described herein, in addition to filtering the content items 136 from the content logs 132 based on the vehicle location 151 and/or the driver status 157, the content set generator 120 can further rank the filtered content items 136 for display on the individual driver devices 150 in order to effect the manner in which the content items 136 are displayed on the driver device 150. Accordingly, the content set generator 120 can make data calls 122, or perform lookups in the content logs 132 based on the driver status 157, the vehicle location 151, and/or the driver data 134 to retrieve a set of content items 136 directly relevant to a particular driver 155.

According to certain implementations, the content set generator 120 can then rank the filtered content items 136 into a ranked content set 138 for display and interaction on the driver device 150. The ranking of the content set 138 can be based on any number of factors that can range in granularity, and the content set generator 120 can dynamically reorganize the displayed content set 138 as certain content items 136 in the content set 138 expire, are updated, or increase or decrease in ranking (e.g., based on the driver's location). For example, a particular content item 136 can be associated with a geo-fenced area or a heat map that directly relates to the content item's 136 ranking on the driver device 150. In this example, if the driver 155 is located at the outer edge of the geo-fence or heat map, the content item 136 can be ranked lower in the content set 138 and thus displayed less prominently on the driver device 150. In certain variations, lower ranked content items 136 are displayed low on a set of content elements or scrollable cards on the driver device 150, whereas highly ranked content items 136 in the set 138 may be readily displayed on the display screen of the driver device 150. If the driver is central to the geo-fence or heat map associated with the content item 136, then the content item 136 can be prioritized and displayed prominently on the driver device 150.

As a dynamic feature on the driver device 150, the ranked content set 138 can be updated depending on factors such as time expiration of a content item 136, location changes of the driver 155, content item 136 relevancy, driver status 157 changes, and content item 136 updates. Furthermore, in some examples, the display content set 138 can be fully interactive on the driver device 150 and enable the driver to select individual content items 136 for more information, or to accept a particular offer, incentive, or suggestion of the content item 136 (e.g., a suggestion to move to an alternative location due to an anticipated increase in ride demand). In certain implementations, the content item set 138 can be transmitted to the driver device 150 via the driver application 152, and can enable the driver 155 to control aspects of its display on the driver device 150. For example, the content set generator 120 can generate the ranked content set 138 such that the driver 155 can implement gestures (e.g., tap, swipe, or pinch gestures) on the display screen to dismiss or delete individual content items 136, scroll through the content set 138, select a content item 136, or dismiss the entire content set 138. Further description of content filter and ranking is provided below with respect to FIG. 1B.

Figure 1B:
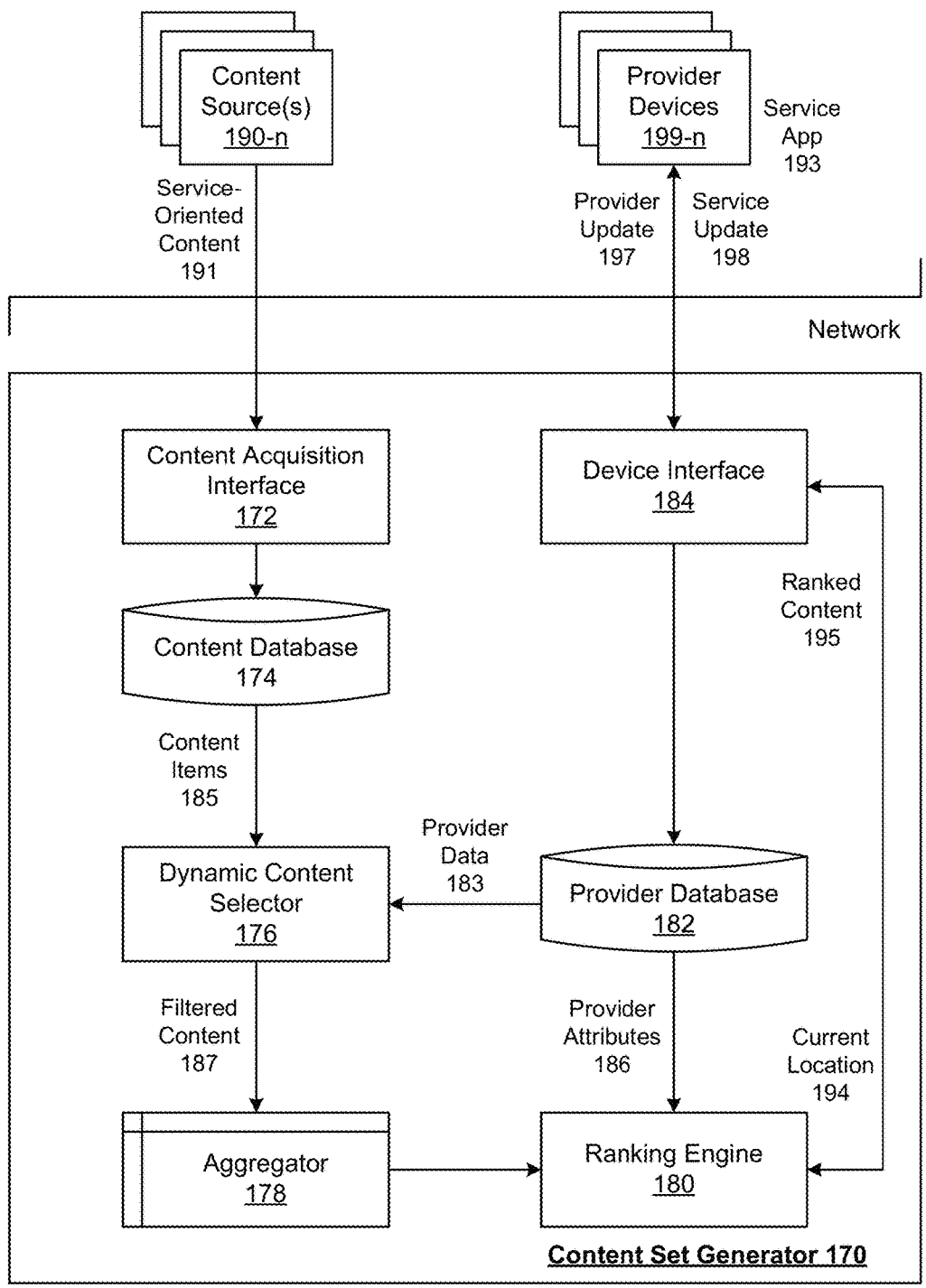
FIG. 1B illustrates an example system for delivering service-oriented content for an on-demand service.

FIG. 1B illustrates an example system for delivering service-oriented content for an on-demand service. In some examples, the service-oriented content may include content that is particularly relevant to the on-demand service. More specifically, the service-oriented content may comprise individual content items that include financial, geographical, and/or social content designed to aid, promote, or otherwise incentivize service providers (e.g., drivers) to perform business-related activities associated with the on-demand service. According to implementations, the content set generator 170 shown in FIG. 1B can be implemented as the content set generator 120 of the transport facilitation system 100 as shown and described with respect to FIG. 1A. In various examples, the content set generator 170 includes a content acquisition interface 172, a device interface 184, a content database 174, a provider database 182, a dynamic content selector 176, an aggregator 178, and a ranking engine 180.

In general, the content set generator 170 can operate in connection with a service system (e.g., the transport facilitation system 100 of FIG. 1A), which can enable an on-demand service to be arranged between customers and one or more service providers (e.g., individuals or entities who operate one or more provider devices 199). Depending on implementation, one or more components of the transport system 100 and/or the content set generator 170 can be implemented on network side resources, such as on one or more servers. The transport system 100 and/or the content set generator 170 can also be implemented through other computer systems in alternative architectures (e.g., peer-to-peer networks, etc.). As an addition or an alternative, some or all of the components of the content set generator 170 can be implemented on client devices, such as through applications that operate on the provider devices 199. For example, a client application can execute to perform one or more of the processes described by the various components of the content set generator 170.

According to examples described herein, the content set generator 170 can be implemented in the context of a transportation facilitation system managing a transportation arrangement service that links available drivers with requesting users. Thus, as used herein, provider devices 199 can comprise driver devices (e.g., mobile computing devices executing a driver-specific application of the transportation arrangement service as shown in FIG. 1A). While the driver operates throughout a given region, the content set generator 170 can provide the driver device with content based on relevance and priority, which the content set generator 170 can determine based on any number of factors, such as the current location of the driver, the driver's status (e.g., available or unavailable), and/or future trip location, as described herein. In various implementations, the content set generator 170 can dynamically push individual content items, or an entire set of content items to the driver device to be displayed in a notification stack ranked in terms of relevance and priority.

The content set generator 170 can communicate, over one or more networks (e.g., wirelessly or via a wired connection), with the provider devices 199 using the device interface 184. In some examples, the provider devices 199 can individually operate a service application 193 that can interface with the device interface 184 to communicate with the content set generator 170. According to some examples, the applications can include or use an application programming interface (API), such as an externally facing API, to communicate data with the device interface 184. The externally facing API can provide access to the content set generator 170 via secure access channels over the network through any number of methods, such as web-based forms, programmatic access via restful APIs, Simple Object Access Protocol (SOAP), remote procedure call (RPC), scripting access, etc., while also providing secure access methods including key-based access to ensure the content set generator 170 remains secure and only authorized users, service providers, and/or third parties can gain access to the content set generator 170.

The content set generator 170 can receive provider updates 197, via the device interface 184, from a plurality of provider devices 199. The provider updates 197 can provide current information about the respective devices and/or their respective users. For example, for each provider device 199, the provider update 197 can include identification information of the service provider or the provider device 199, the current position information of the provider device 199 (e.g., GPS data), the type of vehicle the service provider drives or the service that the service provider provides, the service provider's availability status (e.g., indicating that the service provider is available for service, is off-duty, or is currently servicing other users), and/or the current state of the provider device 199.

In some examples, provider updates 197 can be received when a service provider launches or starts a service application 193 on a respective provider device 199. In other examples, provider updates 197 can be received when the service provider performs certain actions using the service application 193 (e.g., the driver notifies that he or she is available for transport requesting riders or has just completed one or more activities related to the on-demand transportation service). The device interface 184 can also receive provider updates 197 periodically, at different instances in time, or based on a set schedule, after the service provider launches or starts the service application 193. By periodically receiving provider updates 197, for example, real-time position information 194 for the service providers can be provided to the content set generator 170 (e.g., which can receive updated position information if a driver moves from one area to another). Data from the provider updates 197 may be stored in the provider database 182, in connection with the associated service provider (which can correspond to or be a part of the database 130 of FIG. 1A, in some examples).

The content set generator 170 can also communicate, over one or more networks, with one or more content sources 190 using the content acquisition interface 172. In some examples, the content sources 190 may push service-oriented content 191 to the content set generator 170 whenever new content items are created or otherwise become available. Alternatively, the content sources 190 may deliver service-oriented content 191 to the content set generator 170 on a periodic basis. The content sources 190 may be managed and/or controlled by an administrator of the on-demand transportation service. Thus, in some aspects, each content source may provide a different type of service-oriented content 191. For example, a particular content source 190 may provide financial (e.g., earnings) data for each of the drivers of the on-demand transportation service; another content source 190 may provide information about events that are about to occur and/or end at a particular time and location; and yet another content source 190 may provide advertisements and/or other information being promoted by the on-demand transportation service. While the content sources 190 are illustrated in the example of FIG. 1B as communicating with the content set generator 170 over one or more networks, in some examples, one or more content sources 190 can be included with or be a part of the content set generator 170 and/or the transportation facilitation system 100.

The received service-oriented content 191 is stored in the content database 174. Each service-oriented content item 191 may be applicable to one or more (but not necessarily all) service providers depending on the location, preferences, and/or other identifying information pertaining to each service provider. For example, financial data indicating the total earnings of a particular service provider may be applicable only to that provider, whereas promotional advertisements incentivizing referrals for friends and/or family members may be relevant to all service providers associated with the on-demand transportation service. Furthermore, information regarding an upcoming event in a particular area (e.g., a city) may be applicable to service providers currently positioned in or near that area, but may not be applicable to service providers located far away from the area (e.g., beyond a threshold distance, or in a different state).

The dynamic content selector 176 assigns, or otherwise associates, each content item 185 in the content database 174 to one or more service providers based on provider data 183 from the provider database 182. For example, as described above, the provider data 183 may include identification information of the service provider and/or the given region in which the provider device 190 operates. Thus, in some aspects, the dynamic content selector 176 may filter the content items 185 based on the provider data 183, so that each service provider receives only filtered content 187 that is applicable to him/her. For example, the filtered content 187 for a service provider located in Los Angeles may not include information regarding events in San Francisco. On the other hand, the filtered content 187 for a service provider located in the neighboring city of Oakland may include information regarding events in San Francisco and information regarding events in Oakland.

In some implementations, the dynamic content selector 176 may assign an expiration to each content item of the filtered content 187. The expiration mandates the manner in which a particular content item is to be removed from being displayed on a provider device 199, or prevented from being displayed on that device 199. For example, some content items 185 may contain time-sensitive information (e.g., such as an event that is about to begin or end at a specific time), which can render the content item 185 irrelevant once the indicated time period has expired. Other content items 185 may lose their relevancy once the service provider has seen (e.g., scrolled through) and/or acted upon (e.g., clicked or tapped on) the information contained in the content item (e.g., such as advertisements or promotions). Thus, the dynamic content selector 176 may determine the expiration time or expiration conditions for each content item based on user activity and/or a fixed duration of time.

The aggregator 178 aggregates (e.g., by indexing and/or storing) the filtered content 187 to be delivered to each of the provider devices 199. The ranking engine 180 further ranks the filtered content 187 on a per-provider basis (e.g., ranking content items for each individual driver). In some examples, the ranking engine 180 may determine a priority and/or order in which individual content items are to be displayed or otherwise presented on the associated provider device 199. For example, higher-ranked content items may be displayed more prominently, permanently, and/or before lower-ranked content items. In some implementations, each content item may be displayed as a virtual "card" on a service application interface (e.g., a user interface generated by the driver application on the driver device) of the provider device 199, as described in greater detail with respect to FIGS. 3A-3D. The cards may be presented in sequential order (e.g., as a scrollable list or in a multidimensional grid), such that cards with higher-ranking content items are positioned earlier in the sequence (e.g., or higher up in the list) than cards with lower-ranking content items. Thus, the content ranking enables a service provider to view and/or respond to the highest-ranking content items first.

The ranking engine 180 may implement various ranking criteria, including, but not limited to: degree of financial (or business) impact, time-sensitivity of the information, requirement for action, user interaction, and/or degree of relevance. Generally, content items that have a greater impact on the finances and/or business of a particular service provider may be ranked higher than content items (e.g., with less financial impact) for that service provider. For example, content items pertaining to the servicing of customers or requesters of an on-demand service (e.g., to generate income) may be ranked higher than content items pertaining to other aspects of the on-demand service (e.g., such as social media content).

Content items that are more time-sensitive and/or require more immediate action may be ranked higher than content items that are less time-sensitive and/or can be acted upon at a later time. For example, a content item containing information about an upcoming event (e.g., concert, ballgame, conference, etc.) near the service provider's location may be ranked higher than a content item containing a promotion to refer friends and/or family members to join the on-demand service (e.g., as service providers). Furthermore, a content item containing information about an event that is about to end within an hour may be ranked higher than a content item containing information about another event that is about to start in three hours.

In various examples, a provider device 199 can provide a current location 194 (e.g., via GPS resources) to the device interface 184, which the ranking engine 180 can process to dynamically rank content items for the service provider. Thus, the current location 194 can be utilized by the ranking engine 180 as well as the filtered content 187 in order to generate the ranked content set 195 for display on the provider device 199. In the context of transportation arrangement services, the ranking engine 180 can continuously or periodically receive the current location 194 of the driver. As the driver operates a vehicle throughout the given region, the ranking engine 180 can be provided with filtered content 187 based on driver information (e.g., the provider data 183), and can rank the filtered content 187 based in part on the dynamic location 194 of the driver. Furthermore, for more granular notifications, the ranking engine 180 can further determine a path or direction in which the driver is traveling based on the dynamic location 194, and prioritize content that is in a forward operational direction of the driver while deprioritizing or expiring content items that the driver has already passed.

In various examples, the ranking engine 180 can rank actionable content items higher than content items that do not require, or encourage, action by the service provider. For example, the content set generator 170 can rank a content item containing an incentive to earn more in fares higher than a content item containing social media content (e.g., such as a rating or review from a recent user or requester of the on-demand service). Furthermore, the ranking engine 180 can rank interactive content items (e.g., cards that contain links to additional content or information when a user clicks, taps, touches, or otherwise interacts with the card) higher than non-interactive content items (e.g., cards that contain generic advertisements or non-actionable information).

Further, the ranking engine 180 can rank content items that are more likely to elicit user interaction higher than content items that are more likely to be ignored by the service provider. For example, certain types of promotions (e.g., earning more in fares by completing certain tasks) may be more appealing to a particular service provider than other types of promotions (e.g., earning additional income through friend referrals), and thus the ranking engine 180 may rank such content items higher than the other types of promotions. In some aspects, the content set generator 170 may keep track of the number of times each content item is viewed and/or interacted with by a respective service provider. For example, such information may be included in the provider updates 197 sent by a corresponding provider device 199.

In some examples, the content set generator 170 may dynamically adjust the rankings of displayed content items on the provider device 199 (e.g., via service updates 198) based on the detected user interactions, changes in the service provider's location or status, expiration of content items, etc. For example, more frequently viewed content items may be promoted in ranking, whereas less frequently viewed content items may be demoted in ranking and/or removed from the corresponding provider device 199. In other examples, the content set generator 170 may determine a ranking for new content items to be sent to the provider device 199 based on past user interactions with similar types of content items. For example, if the service provider has interacted with a number of content items promoting referrals in the past, new content items containing promotions for referrals may be assigned even higher rankings than the past content items. Along these lines, the provider updates 197 can include data indicating provider interactions with individual content items, which can be compiled in the provider database 182. The content set generator 182 can analyze the compiled provider data 183 to determine a set of provider preferences, which can be utilized by the dynamic content selector 176 to filter the content items 185 from the content database 174.

Although each content item in the set of filtered content 187 for a particular service provider should be applicable to that service provider, there may be varying degrees of relevance. For example, some content items 185 may be applicable to only one service provider (e.g., a content item containing information about a particular service provider's daily earnings and/or activity), whereas other content items 185 may be generally applicable to all service providers (e.g., a content item containing a promotion to refer friends and/or family members to join the on-demand service). Still further, some content items 185 may be applicable to only a subset of service providers (e.g., a content item containing information about an event that is about to start and/or end in a particular area or location).

In some aspects, the ranking engine 180 may rank content items that are applicable to fewer service providers higher than content items with more general applicability. This may ensure that each service provider is able to immediately view any information that is exclusively relevant to them (e.g., historical activity, financial information, and/or notifications and alerts for a particular service provider). Furthermore, ranking content items based on a degree of relevance to a particular service provider, in relation to other service providers, may be beneficial to both requesters and providers of an on-demand transportation service. For example, a content item containing information about an event that is scheduled to start or end at a particular location may be applicable to only a small subset of service providers (e.g., based on the remoteness and/or population density of the location). Thus, requesters at that location may benefit from having that small subset of service providers prioritize servicing that location (e.g., over other locations within range where service providers are more readily available). Similarly, the small subset of service providers may benefit from having less competition at that location (e.g., over other locations within range where service providers are more readily available).

In some implementations, the ranking engine 180 may determine a degree of relevance for each content item to be delivered to a particular service provider, for example, by analyzing the filtered content 187 (e.g., in the aggregator 178) to determine how many additional service providers are to receive that content item. A content item that is applicable to a greater number of service providers may have a lower degree of relevance to any particular service provider. Thus, a content item assigned to only a single service provider may have a higher degree of relevance and rank than a content item (in the same subset) that is assigned to a small subset of service providers, which, in turn, may have a higher degree of relevance and rank than a content item (in the same subset) that is assigned to a larger subset of service providers.

In other implementations, the ranking engine 180 may further determine the ranking for each content item to be delivered to a particular service provider based, at least in part, on one or more attributes and/or preferences 186 of a particular service provider, or a corresponding provider device 199 (e.g., as determined by the provider updates 197), which may affect the ranking of filtered content 187 for that service provider. Based on the GPS location 194 of a provider device 190, the ranking engine 180 may assign a higher ranking to location-dependent content items that are closer to the location of the provider device 199 than other location-dependent content items (e.g., that are further away from the provider device 1990). Furthermore, the provider attributes or preferences 186 may indicate that the service provider prefers low traffic areas, or areas in which the service provider can earn more money. The attributes or preferences 186 can further indicate the type of vehicle the service provider drives (e.g., a van, SUV, luxury car, etc.), which the ranking engine 180 can further utilize to rank the filtered content 187 for display on the provider device 199. Along these lines, the provider database 182 can store a service provider profile including the provider attributes and preferences 186 (which can be inputted by the provider or learned by the content set generator 170 over time). The ranking engine 180 can utilize provider attributes and preferences 186 and the current location 194 of the provider in order to ultimately rank the filtered content 187 relevant to the service provider—as filtered by the dynamic content selector 176.

The ranking engine 180 may weigh the various ranking criteria differently. For example, the degree of relevance to a particular service provider may be weighted more heavily (e.g., have a more substantial or pronounced effect on the actual rank assigned to the content item) than all other criteria. Thus, in some examples, content items that are uniquely applicable to a single service provider (e.g., such as content items containing financial information pertaining to a particular service provider) may be displayed before and/or more prominently than all other content items on that service provider's provider device 199. The weighting assigned to the various ranking criteria may be customizable (e.g., based on the preferences of the individual service providers) and/or programmatically determined (e.g., based on detected user interactions with the content items).

The ranking engine 180 can output a set of ranked content 195, for each service provider, to the device interface 184. Each set of ranked content 195 may include the filtered content 187 for a particular service provider (and/or provider device 199) and ranking information indicating a respective rank for each content item in the set 195. The device interface 184 may deliver each set of ranked content 195, as a service update 198, to a corresponding provider device 199. The provider device 199 may then render and/or display the received content items in the ranked content set 195 in an order based on their respective rankings (e.g., as described in greater detail below with respect to FIGS. 3A-3D).

In the context of transportation services, drivers can operate throughout a given region utilizing a driver device 199 executing a service application 193 (e.g., a designated application that enables the driver to receive pick-up requests from requesting users) that can periodically or continuously display the ranked set of content items 195. In one example, the content set generator 170 can be triggered to transmit the ranked set of content items 195 for display on the driver device 199 based on one or more conditions. For example, while the status of the driver indicates that the driver is busy or currently transporting a requesting user, the driver device 199 may display map and route data that guides the driver to a destination location of the requesting user. However, in response to detecting the driver arriving at the destination location for drop-off (e.g., via a provider update 197), the content set generator 170 can trigger the ranked set of content items 195 to be displayed on the driver device 199.

According to examples described herein, the ranking process performed by the ranking engine 180 can be a background process where the ranked set of content items 195 is only displayed once the triggering conditions are met. In one example, if the driver is available and/or off-duty and has not accepted a transport request, then the ranking engine 180 can push the dynamically ranked set of content items 195 for display on the driver device 199. Thereafter, the ranked content 195 can be dynamically updated on the driver device 199 based on the ranking and prioritizations described herein. Furthermore, if the driver is currently driving throughout the given region, is also available, and has not accepted a transport request, then the ranked set of content items 195 can also be dynamically updated on the driver device 199 based, at least in part, on the ever-changing location of the driver driving throughout the given region.

It is contemplated that once the driver accepts a transport request, the display of the driver device may necessitate mapping and routing content until the drop-off is made. Thus, in certain implementations, provider updates 197 can include status information indicating whether conditions are safe or otherwise appropriate to push the ranked set of content items 195 to the driver device 199. In one example, the content set generator 170 can push the ranked set of content items 195 whenever the current location data 194 indicates that the driver is stopped (e.g., at an intersection). In variations, the content set generator 170 can transmit the ranked set of content items 195 for display on the driver device 199 in response to a request by the driver. In such variations, the service application 193 can include a displayed selectable feature (e.g., a menu item), which, when selected, can trigger the content set generator 170 to push the ranked set of content items 195 to the driver device 199 for display.

Methodology

Figure 2A:
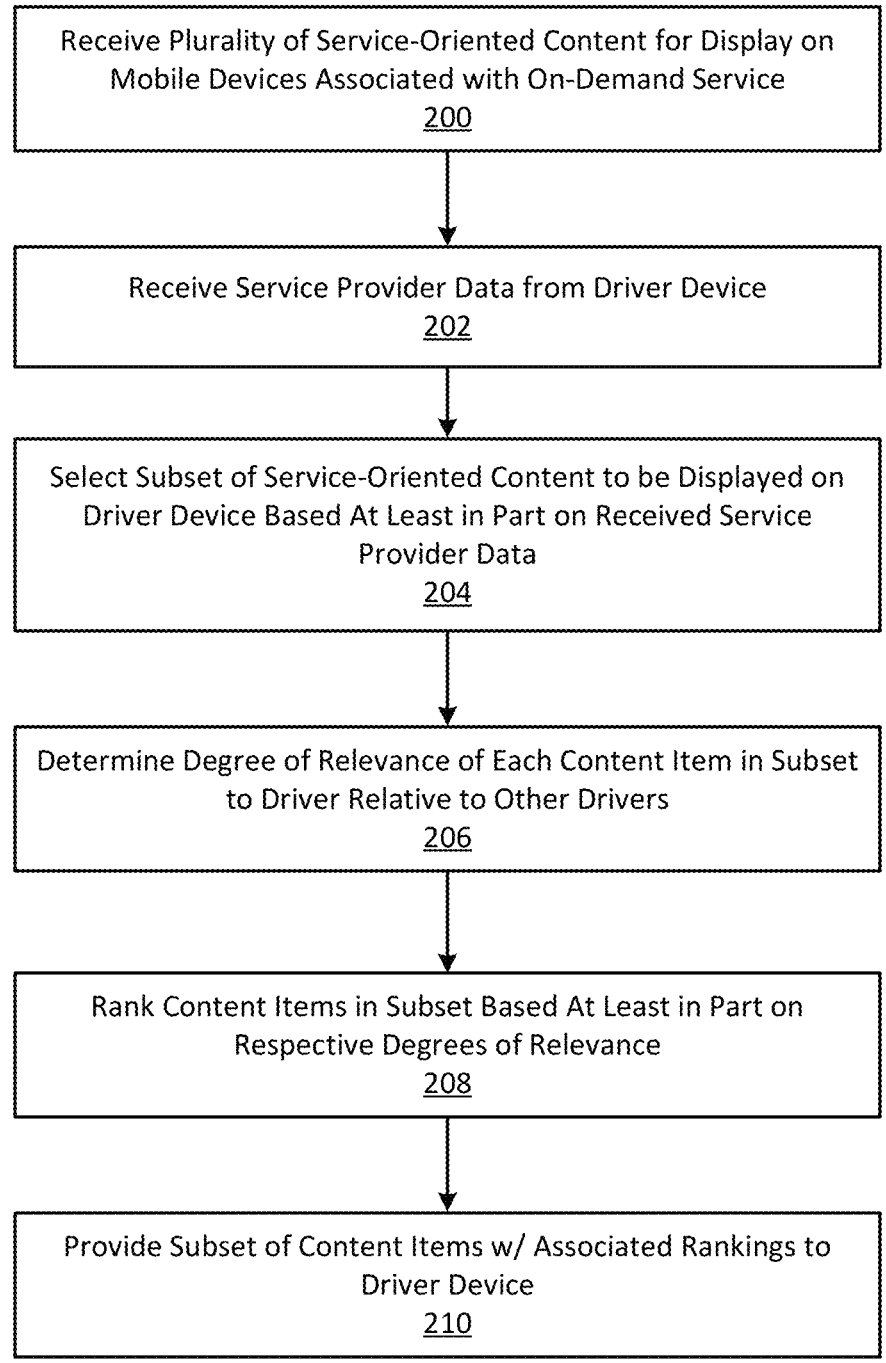
FIG. 2A illustrates an example method of delivering service-oriented content for an on-demand service.

FIG. 2A illustrates an example method of delivering service-oriented content for an on-demand service. A method such as described by an example of FIG. 2A can be implemented using, for example, components described with an example of FIGS. 1A and 1B. Accordingly, references made to elements of FIGS. 1A and 1B are for purposes of illustrating a suitable element or component for performing a step or sub-step being described.

The transport facilitation system 100 initially generates, retrieves, and/or receives a plurality of service-oriented content items for display on mobile devices associated with the on-demand transportation service (200). For example, the entity that operates the transport facilitation system 100 can generate content items to provide information and/or to assist service providers. The content items may include financial, geographical, and/or social content designed to aid, promote, or otherwise incentivize service providers to perform business-related activities associated with the on-demand service or to educate service providers with respect to the on-demand service, the city or geographic region, or new features or products associated with the on-demand service. In some aspects, the transport facilitation system 100 may receive the content items from one or more third party content sources 145 (e.g., via the network interface 115). For example, the third-party sources 145 may push the content items to the transport facilitation system 100 whenever new content becomes available. The received content items may be applicable to one or more service providers (e.g., one or more drivers operated throughout a given region managed by the transport facilitation system 100), and may be stored in the content database 130. Additionally or alternatively, the content items may be generated automatically by the transport facilitation system 100 (e.g., financial earnings updates for a driver) or by human designers or administrators associated with the transportation arrangement service (e.g., promotional items or demand notifications).

The transport facilitation system 100 also receives service provider data 183 from a mobile device of a driver (i.e., driver device 150) (202). The service provider data 183 may include current information about the driver device 150 and/or the driver associated with the driver device 150 (e.g., identification information of the driver and/or current position information 194 of the driver device 150). In some aspects, the transport facilitation system 100 may receive the service provider data 183, as provider updates 197, when a driver initiates a service application 193 on a respective provider device 199 and/or performs certain actions using the service application 193. In other aspects, the transport facilitation system 100 may receive provider updates 197 periodically, at different instances in time, or based on a set schedule, after the driver launches or starts the service application 193. In another example, the transport facilitation system 100 can receive service provider data 183 before, during, or after receiving the plurality of service-oriented content items.

The transport facilitation system 100 may then select a subset of the service-oriented content (e.g., a filtered set of content items 187) to be displayed on the driver device 150 based at least in part on the received service provider data 183 (204). As described above, each service-oriented content item 185 may be applicable to one or more (but not necessarily all) drivers depending on the location, preferences, and/or other identifying information pertaining to each driver. Thus, in some aspects, the dynamic content selector 176 may assign, or otherwise associate, each content item 185 to one or more drivers based on the received service provider data 183. For example, the content items 185 may be filtered, based on the provider data 183, so that each driver can receive only filtered content 187 that is applicable to him/her (e.g., the subset of service-oriented content).

In some implementations, the dynamic content selector 176 may assign an expiration to each content item of the filtered content 187. For example, the expiration may indicate the manner in which a particular content item is to be removed from a driver device 150 (e.g., or prevented from being displayed on that device 150). In some aspects, the dynamic content selector 176 may determine the expiration for each content item based on user activity (e.g., indicating that a driver has seen and/or acted upon the content item) and/or a fixed duration of time (e.g., indicating that the time-sensitive information contained in the content item has expired or is no longer relevant).

The transport facilitation system 100 further determines a degree of relevance of each content item in the filtered subset to the driver associated with the driver device 150, relative to other drivers associated with the on-demand transportation service (206). For example, some content items 185 may be applicable to only one driver (e.g., a tailored earnings update), other content items 185 may be applicable to a subset of two or more drivers (e.g., location-sensitive notifications), and some content items 185 may be generally applicable to all drivers (e.g., promotional offers). In some aspects, the ranking engine 180 may determine a degree of relevance for each content item to be delivered to a particular driver, for example, by analyzing the filtered content 187 to determine how many additional drivers are to receive that content item. For example, a content item that is applicable to a greater number of drivers may have a lower degree of relevance to any particular driver.

For each driver, the content items in the filtered subset are then ranked based, at least in part, on their respective degrees of relevance (208). In some aspects, content items having higher degrees of relevance to a particular driver (e.g., and are thus applicable to fewer drivers) may be ranked higher than content items having lower degrees of relevance (e.g., and are thus applicable to a greater number of drivers). For example, a content item assigned to only a single driver may be ranked higher than a content item (in the same subset) that is assigned to a small subset of drivers, which, in turn, may have a higher ranking than a content item (in the same subset) that is assigned to a larger subset of drivers.

In some implementations, the ranking engine 180 may use a combination of ranking criteria to determine a rank for each content item in the filtered subset. For example, other ranking criteria may include, but are not limited to, degree of financial (or business) impact, time-sensitivity of the information, and/or requirement for action. In particular, content items that have a greater impact on the finances and/or business of a particular service provider may be ranked higher than other content items (e.g., with less financial impact) for that driver. Further, content items that are more time-sensitive and/or require more immediate action may be ranked higher than content items that are less time-sensitive and/or can be acted upon at a later time. Still further, actionable content items may be ranked higher than content items that do not require, or encourage, action by the driver.

In other implementations, the ranking engine 180 may determine the ranking for each content item to be delivered to a particular driver based, at least in part, on the received service provider data 183 for that driver. For example, the service provider data 183 may be indicative of one or more attributes and/or preferences of the driver, which may affect the ranking of filtered content 187 for that driver.

Finally, the transport facilitation system 100 may provide the subset of content items, with the associated ranking information, to the driver device 150 (210). For example, the ranking engine 180 may output a set of ranked content items 195, which includes the filtered content 187 and ranking information for a particular driver, to the device interface 184. The device interface 184 then delivers the set of ranked content 195, as a service update 198, to a corresponding driver device 150. The driver device 150 may then render and/or display the received content items in an order based on their respective rankings.

In this manner, the transport facilitation system 100 can increase the overall efficiency and/or effectiveness of an on-demand transportation service. For example, by ranking content items based on a degree of relevance to a particular driver relative to other drivers, requesters of the transport service system may benefit from having certain drivers prioritize their needs over other requesters, while the drivers may benefit from having less competition in their high-priority areas.

Still further, in some examples, for individual drivers, the transport facilitation system 100 can keep track of which content items are currently displayed (or can be displayed) via the driver application 152 on the driver device 150 and the current ranking of those content items. When a new content item is received at the transport facilitation system 100 and is to be provided to the driver device 150, the transport facilitation system 100 can dynamically (i) determine the service provider data 183 for that driver, (ii) determine that the new content item is to be displayed on the driver device 150, (iii) determine the ranking of the new content item and the content items that are currently displayed, and (iv) cause the driver application 152 to insert the new content item in the set of content items that are currently displayed and/or remove one or more content items that are currently displayed based on the ranking.

Figure 2B:
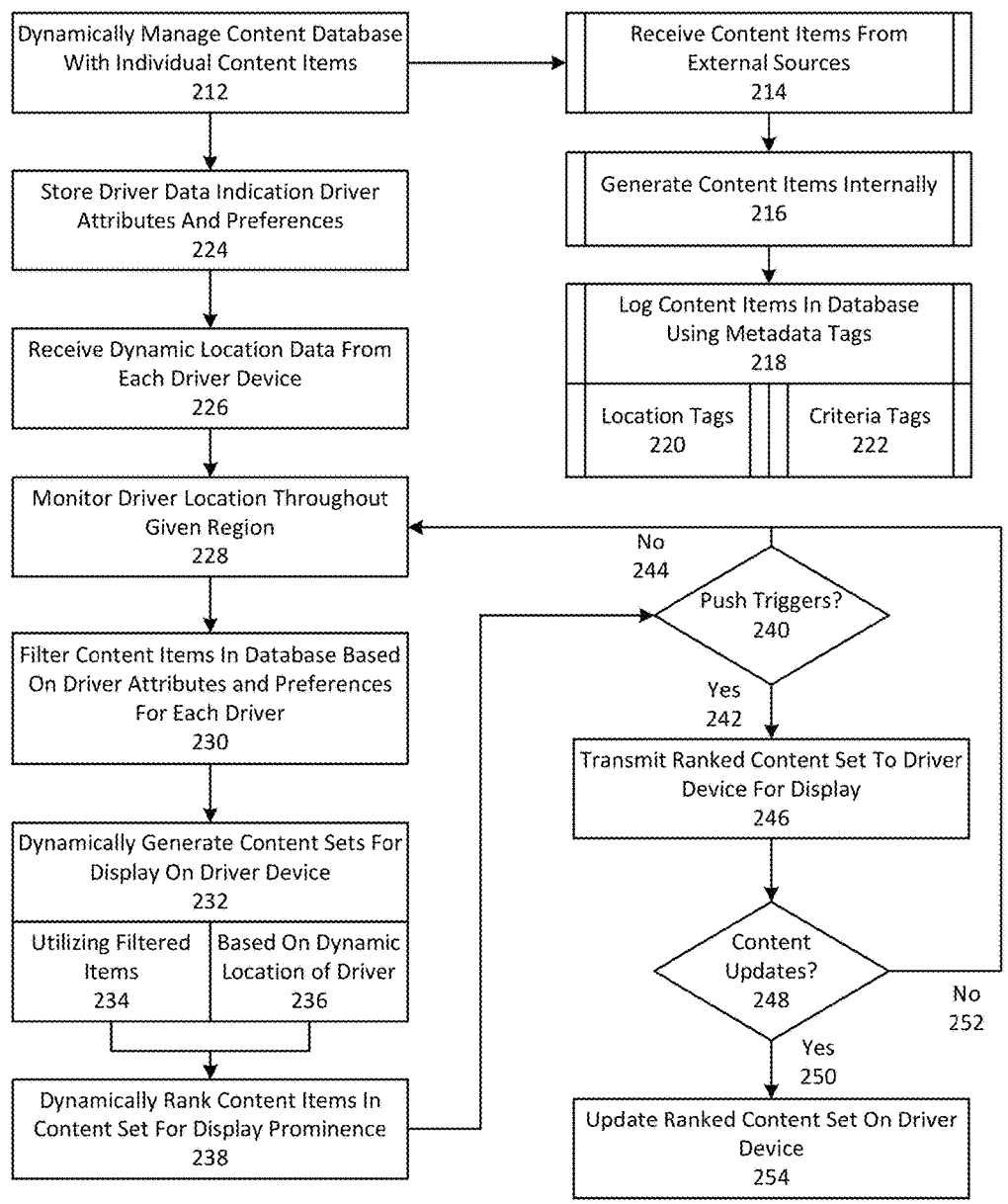
FIG. 2B is a flow chart describing an example method of delivering service-oriented content to driver devices in connection with an on-demand transportation arrangement service.

FIG. 2B is a flow chart describing an example method of delivering service-oriented content to driver devices in connection with an on-demand transportation arrangement service. In the below description of FIG. 2B, reference may be made to reference characters representing like features as shown and described with respect to FIGS. 1A and 1B. Furthermore, the below steps discussed in connection with FIG. 2B may be performed by an example content set generator 120, 170 of a transport facilitation system 100 as shown and described with respect to FIGS. 1A and 1B. Referring to FIG. 2B, the content set generator 170 can dynamically manage a content database 174 having individual content items 185 (212). In managing the content database 174, the content set generator 170 can receive content items from external sources 190 (214) and/or generate content items internally (216).

For example, the transport facilitation system 100 can automatically update driver account information whenever a driver makes a pick-up or drop-off or accepts a pick-up request. The content set generator 170 can automatically generate a content item indicating the updated account information for the driver (e.g., an earnings update content item) for display in a ranked set of content items 195 on the driver device 150. In certain implementations, the earnings update content item is highly specific to the driver, and thus the content set generator 170 can prioritize the earnings update content item as a highest ranked item for display on the driver device 150. As another example, third party content 147 from external sources can cause the content set generator 170 to automatically generate content items reacting to a potential ride demand source, such as an upcoming event or event completion (e.g., a sports event). Thus, a third party source 145 can indicate the conclusion of an event, which the content set generator 170 can determine will create an increase in ride demand. The content set generator 170 may then generate a content item to incentivize proximate drivers in relation to the event to remain or travel towards the predicted demand source for display on those driver devices 150.

According to examples described herein, the content set generator 170 may then log each of the content items 185 in the content database 174 using metadata tags (218). In certain examples, the tags can include location-based tags indicating a specific location, geo-fence, or heat map pertaining to the content item (220). Additionally or alternatively, the tags can include criteria tags indicating criteria that need to be met in order for the content item to be included in a filtered set of content items for potential display on a driver device (222). As described, these criteria can comprise driver attributes (e.g., a type of vehicle the driver operates, an overall rating of the driver, etc.), driver preferences (e.g., a preferred area of operation, preferred events, preferred hours of operation, etc.), and the current location 194 of the driver.

In many aspects, the content set generator 170 can further store driver data 183 indicating the driver attributes and preferences (e.g., a driver profile) of each driver operating throughout the given region (224). The content set generator 170 can receive dynamic location data 194 from each driver device 150 of drivers operating, or on-duty, in the given region (226). In some aspects, receiving the location data 194 can be triggered when a driver initiates the driver application 152 on the driver device 150. The content set generator 170 may then monitor the driver location 194 as the driver operates throughout the given region (228). In certain implementations, the content set generator 170 can also receive driver updates 197 indicating changes to the driver's status 157 (e.g., currently servicing, available, busy, off-duty, on break, and the like). As described herein, a driver status update can comprise a trigger regarding whether the content set generator 170 is to transmit an individual content item or the entire ranked set of content items to the driver device 150. In certain implementations, the content set generator 170 can provide the set of ranked content items 195 when the driver status 157 indicates available or off-duty, but can refrain from transmitting the ranked set 195 when the driver status 157 indicates that the driver is busy. In other variations, the content set generator 170 can generate the ranked set of content items 195 to be displayed in a different manner based on the driver status 157 (e.g., less prominently when the driver is busy servicing a pick-up request 164).

In certain implementations, for each particular driver, the content set generator 170 can initially filter the content items 185 in the content database 174 based on the driver's attributes and preferences indicated in the driver database 182 (230). This can significantly narrow the set of filtered content items 187 that the content set generator 170 can utilize for each particular driver. Thus, the content set generator 170 can dynamically generate content sets for display on the driver device 150 (232). The dynamically generated content set can comprise content items from the filtered set of content items 187 (234) and can further be based on the dynamic location 194 of the driver within the given region (236). Furthermore, in continuously generating the content set, the content set generator 170 can provide the driver with only up-to-date information tailored specifically for that driver.

Utilizing the generated content set, the content set generator 170 can dynamically rank the content items for display prominence on the driver device (238). As provided herein, the content set generator 170 can provide such ranking updates to the driver device 150 via the driver application 152 in order to cause the driver device 150 to reorganize or restructure the manner in which the ranked set of content items 195 are displayed. In variations, the content set generator 170 can dynamically rank the content items as a background process in a standby mode if the driver is currently utilizing the display of the driver device 150 for other purposes (e.g., routing or guidance to a destination location). Thus, the content set generator 170 can detect any push triggers that can cause the ranked set of content items 195—or any individual content items on the ranked set—to be displayed on the driver device 150 (240). In various examples, the push triggers can comprise the location tags (e.g., the driver traveling into a geo-fence associated with a content item) or criteria tags (e.g., the driver achieving a milestone associated with a content item, and/or having a status associated with the content item) for the individual content items. Additionally or alternatively, the detected push trigger can comprise a change in driver status 157 (e.g., when the driver initiates the driver application 152, or when the driver becomes available).

If a push trigger is detected (242), then the content set generator 170 can transmit the ranked set of content items 195 to the driver device 150 for display (246). As described, the content items in the ranked set 195 can be dynamically ranked based on various factors, and thus the dynamic ranking can be reflected on the displayed set on the driver device 150. However, if no push trigger is detected (244), then the content set generator 170 can continue to monitor the driver location 194 throughout the given region (228) and filter and rank content items based in part on the driver location 194. Furthermore, while the ranked content set 195 is displayed on the driver device 150, the content set generator 170 can determine whether any content updates have been received (248). Such content updates can include new content items generated by the transport facilitation system 100, an administrator, or an external source—or can include any updates to current content items already logged in the content database 174.

If a content update is detected (250), then the content set generator 170 can update the ranked content 195 on the driver device 150 accordingly (254). However, if there is no content update (252), then the content set generator 170 can continue to monitor the driver location (228), filter content items (230), dynamically generate content item sets (232) based in part on the dynamic location 194 of the driver (236), and rank the content items for display prominence on the driver device 150 as the driver travels throughout the given region (238).

User Interface Examples

FIGS. 3A-3D illustrate an example user interface 350 for displaying provider-specific ranked content. The user interface 350 illustrates a user interface that can be provided by a service application running on a mobile device 300 of a service provider (e.g., a driver). The user interface 350 can be provided based on, for example, service-oriented content provided by the transport facilitation system 100 (e.g., as service updates 198). Such an application can be provided by an entity that enables an on-demand service (such as a transport service, a delivery service, a food truck service, etc.) to be arranged between parties. The service application can enable data to be exchanged between the service application (and computing device) and the transport facilitation system 100 so that a user of the computing device can view service-oriented content provided by the transport facilitation system 100.

The user interface 350 includes a selection feature 310 to enable the service provider to go "online" or on-duty. For example, when the service application is first launched or opened, the user interface 350 may initially display in an "offline" mode. When the service application is offline, the provider may not be available to provide on-demand services. By activating (e.g., clicking, tapping, touching, or otherwise interacting with) the selection feature 310, the service provider may receive and respond to service requests communicated by the on-demand service (e.g., via the transport facilitation system 100). In some aspects, the transport facilitation system 100 may dynamically update the position information (e.g., GPS data) for the service provider while the user interface 350 is in the online or offline mode. As described above, with reference to FIG. 1A, the transport facilitation system 100 may use the position information to deliver service-oriented content items to the mobile device 300 that are targeted and ranked for the particular service provider associated with the mobile device 300.

The service-oriented content items may be displayed on the user interface 350 as a set of scrollable virtual cards 302-309. The virtual cards 302-309 can overlay or be part of a map of a given geographic region 301 (e.g., corresponding to the current location of the mobile device 300). In some aspects, the virtual cards may be presented as a scrollable list 302-309, wherein the service provider may tap-and-drag (or click-and-drag) on the user interface 350 to reveal more virtual cards. The order in which the virtual cards 302-309 are presented may depend on the respective rankings of the service oriented content items provided on each card. For example, virtual cards with high-ranking content items will be displayed before or above virtual cards with lower-ranking content items (e.g., as the service provider scrolls through the list).

Figure 3A:
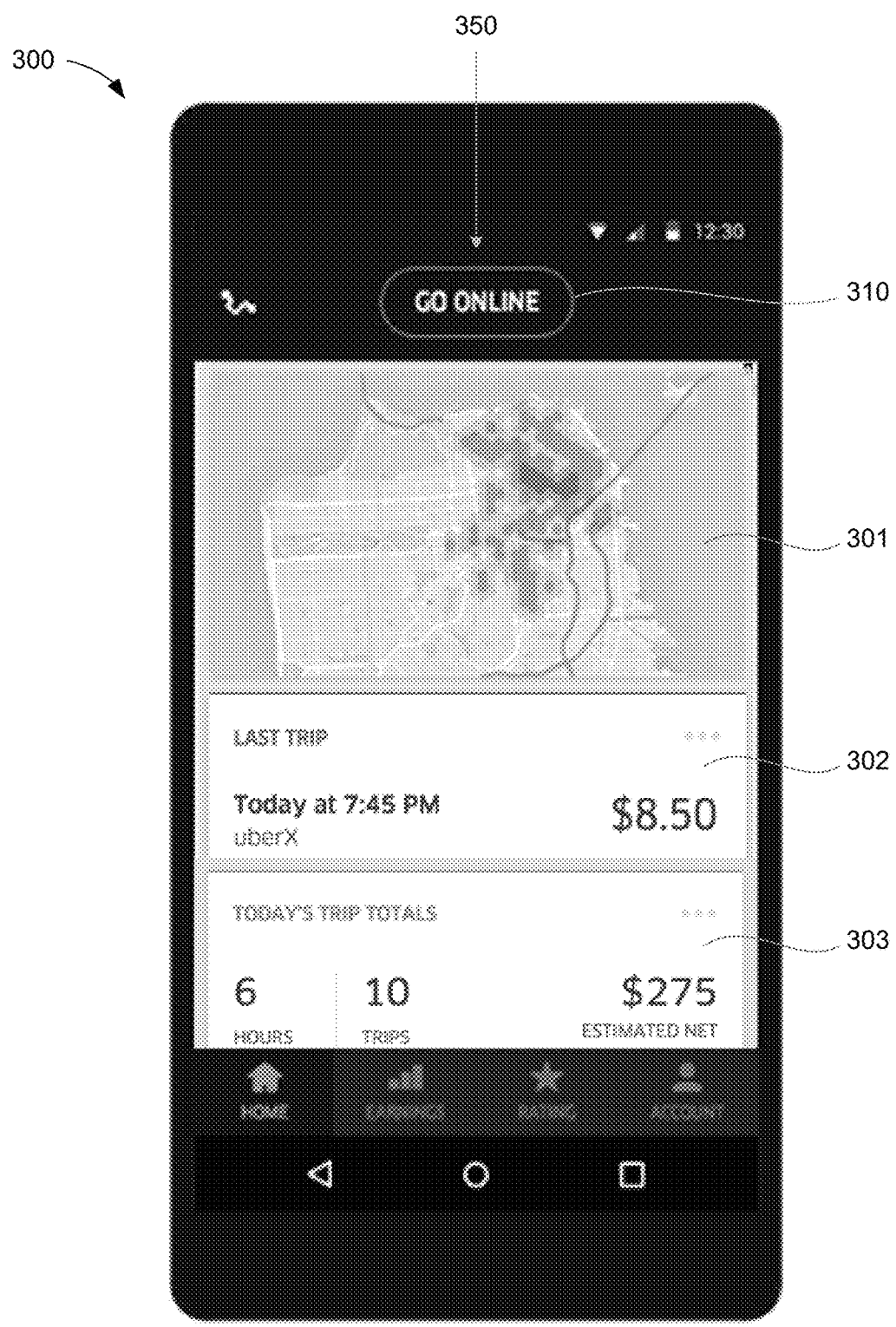
FIGS. 3A-3D illustrate an example user interface for displaying provider-specific ranked content.

With reference to FIG. 3A, the user interface 350 displays a set of virtual cards 302 and 303 that contain financial and business-related information for the particular service provider associated with the mobile device 300. In particular, card 302 shows the total earnings from the service provider's most recent service activity (e.g., $8.50). Card 303 shows the total number of hours worked (e.g., 6 hours), the total number of services provided (e.g., 10 trips), and the service provider's total earnings (e.g., $275) for the day. The information contained on virtual cards 302 and 303 has a very high degree of relevance to the particular service provider associated with mobile device 300 (e.g., since the information is not applicable to any other service providers) and is very important to the service provider's business and/or finances (e.g., since it indicates current and/or past earnings). Thus, virtual cards 302 and 303 may have the highest ranking among the set of virtual cards 302-309 provided on the mobile device 300. In some examples, one or more of the cards 302-309 can also be selectable by the service provider to view additional content associated with the selected card. For example, if the service provider selects the card 303, which includes content corresponding to earnings for a given duration of time, the application can display (on the user interface 350) a graph or visual chart showing additional details about that service provider's earnings.

Figure 3B:
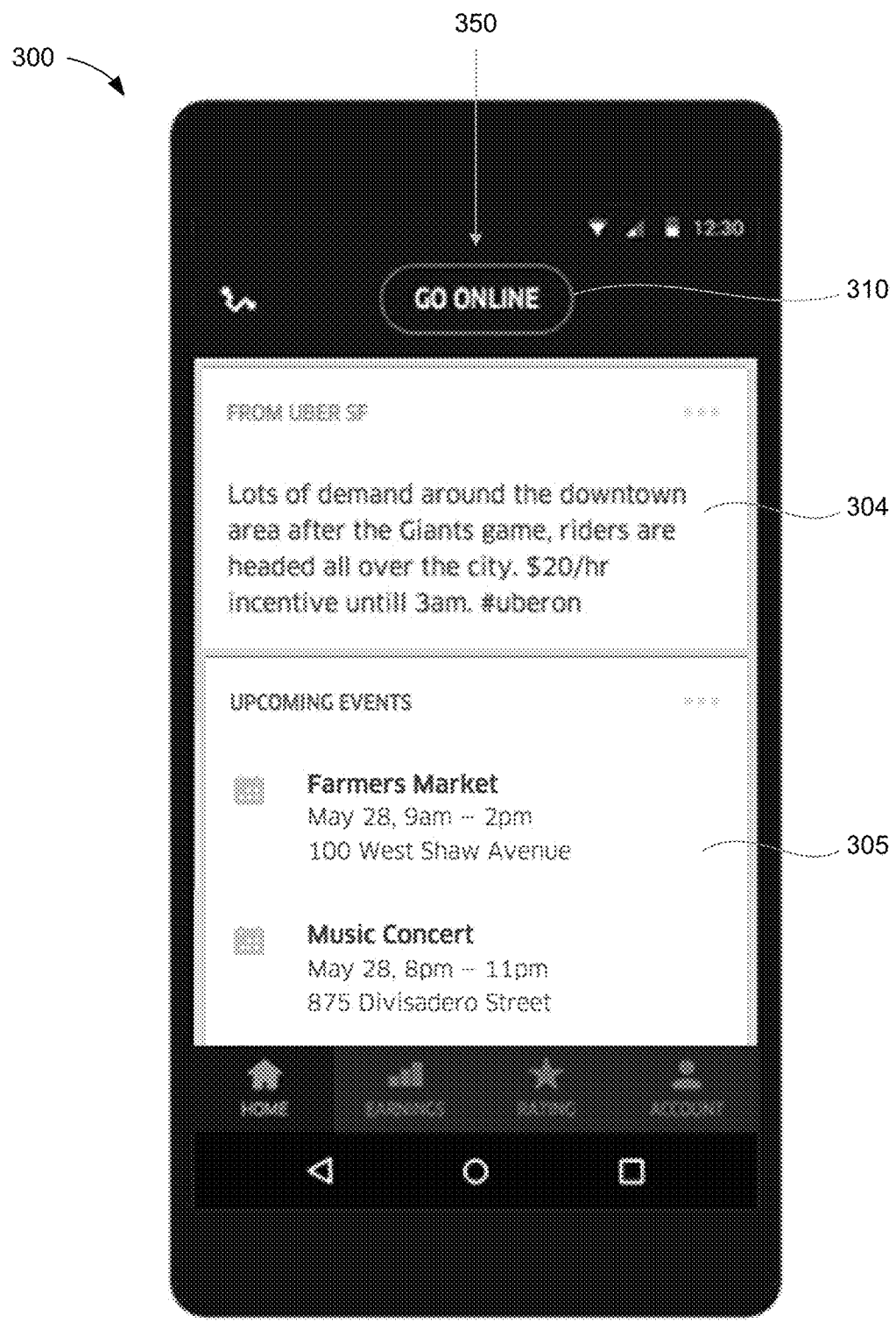

With reference to FIG. 3B, the user interface 350 displays a set of virtual cards 304 and 305 that contain location-based incentives to provide more on-demand services and/or increase earnings. In particular, card 304 shows a snippet of social media content indicating an area of potential increased demand for on-demand services (e.g., "Lots of demand around the downtown area after the Giants game") and a financial incentive for servicing that area (e.g., "$20/hr incentive until 3 am"). Card 305 shows a miniature news feed indicating events that are about to begin and/or end in a particular area (e.g., "Farmers Market" and "Music Concert"). The information contained on virtual cards 304 and 305 is highly time-sensitive (e.g., requires immediate action within a narrow window of time), has a relatively high degree of relevance to the particular service provider associated with the mobile device 300 (e.g., since the information may be applicable only to a small subset of service providers located within the city of San Francisco), and is relatively important to the service provider's business and/or finances (e.g., since it incentivizes future earnings). Thus, virtual cards 304 and 305 may have a relatively high ranking among the set of virtual cards 302-309 provided on the mobile device 300.

Figure 3C:
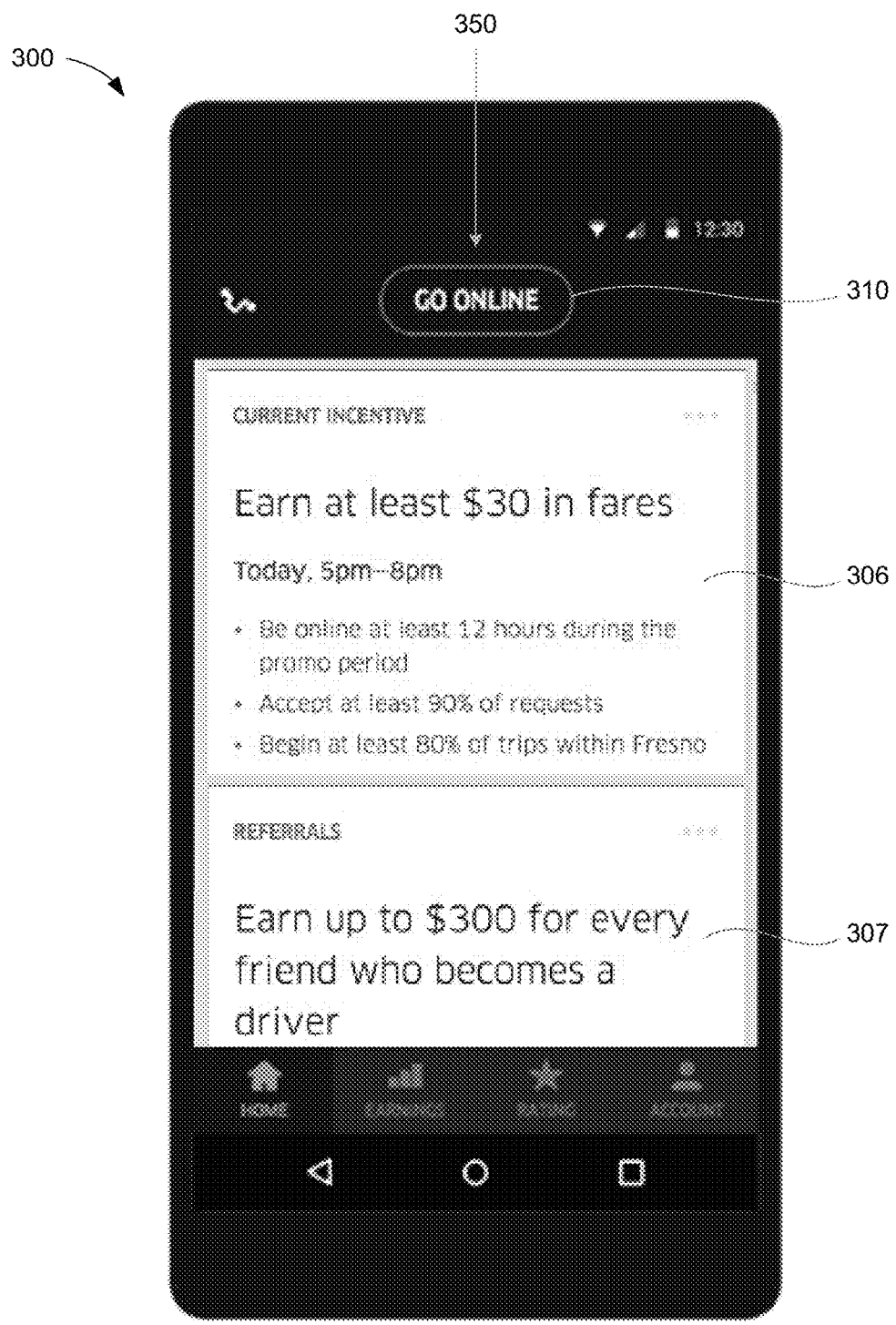

With reference to FIG. 3C, the user interface 350 displays a set of virtual cards 306 and 307 that contain generic incentives to provide more on-demand services and/or increase earnings. In particular, card 306 shows a promotional incentive to earn more in fares upon completing a number of tasks during a given period of time (e.g., "Earn at least $30 in fares"). Card 307 shows a promotion to earn additional income by referring friends to become service providers (e.g., "Earn up to $300 for every friend who becomes a driver"). The information contained on virtual cards 306 and 307 is relatively time-sensitive (e.g., the promotions may expire after a certain period of time further into the future), and is relatively important to the service provider's business and/or finances (e.g., since it incentivizes future earnings), but has a relatively low degree of relevance to the particular service provider associated with the mobile device 300 (e.g., since the promotions may be applicable to all, or at least a larger subset of, service providers). Thus, virtual cards 306 and 307 may have a relatively low ranking among the set of virtual cards 302-309 provided on the mobile device 300.

Figure 3D:
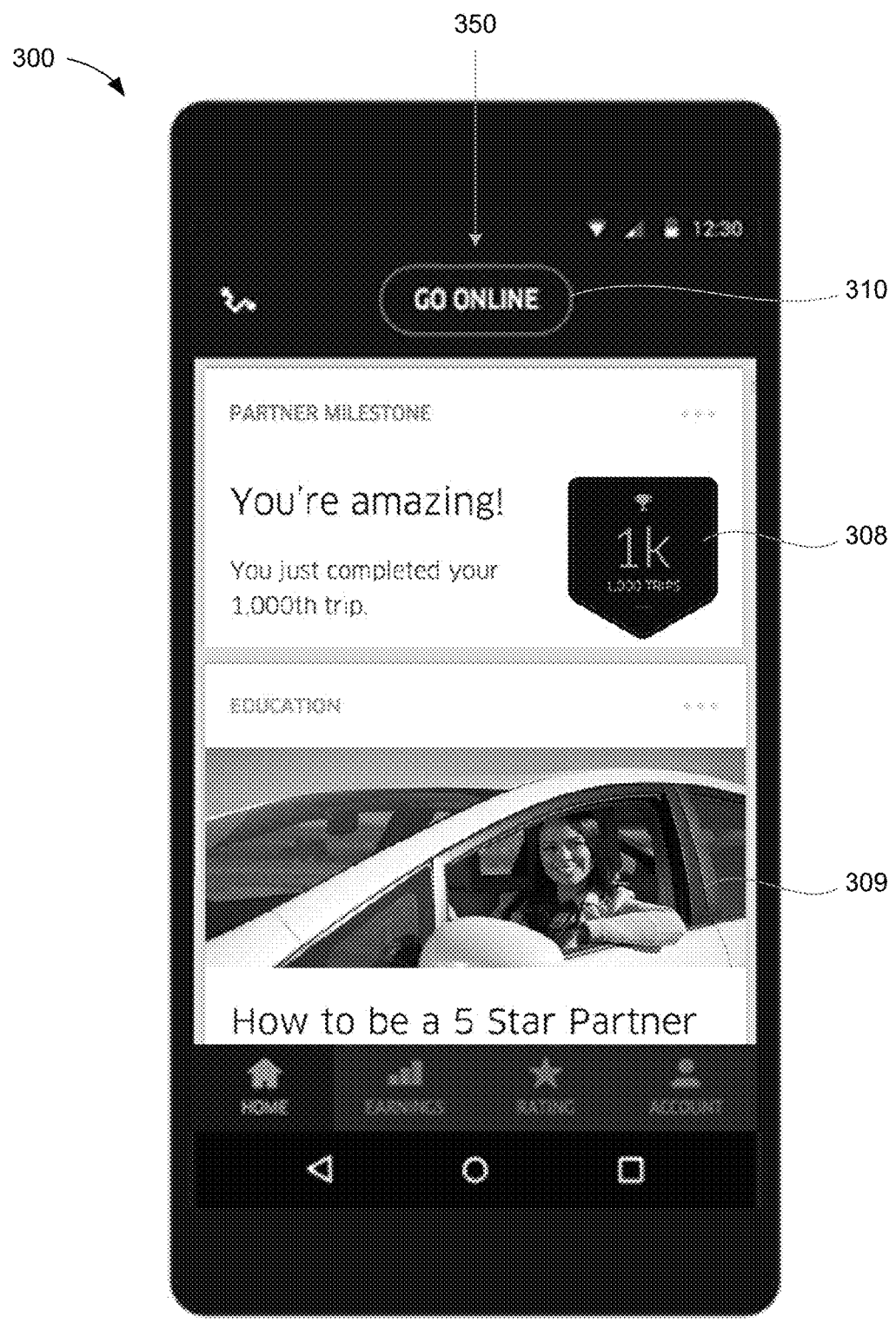

With reference to FIG. 3D, the user interface 350 displays a set of virtual cards 308 and 309 that contain generic advertisements and/or notifications related to social aspects of the on-demand service. In particular, card 308 shows a notification that the service provider has reached a particular milestone with respect to the on-demand service (e.g., "You just completed your 1,000th trip"). Card 309 shows an advertisement for an educational program that teaches service providers how to increase their social status in the on-demand service (e.g., "How to be a 5 Star Partner"). The information contained on virtual cards 308 and 309 is not time-sensitive and may have little importance to the service provider's business and/or finances. Moreover, the information contained on virtual card 309 has a very low degree of relevance to the particular service provider associated with the mobile device 300 (e.g., since the advertisement is applicable to all service providers). Thus, virtual cards 308 and 309 may have the lowest ranking among the set of virtual cards 302-310 provided on the mobile device 300.

In some implementations, one or more of the virtual cards 302-309 may have a persistent presence in the user interface 350 while the content and/or information contained in the cards dynamically changes. For example, the service provider may be presented with a snapshot of his/her most recent business and financial activity (e.g., cards 302 and 303) each time the service provider launches the service application and/or completes a particular activity. Accordingly, the virtual cards 302 and 303 may maintain their presence (and position) in the user interface 350, and may be dynamically updated with new information whenever new content items are available from the system 100.

Hardware Diagrams

Figure 4:
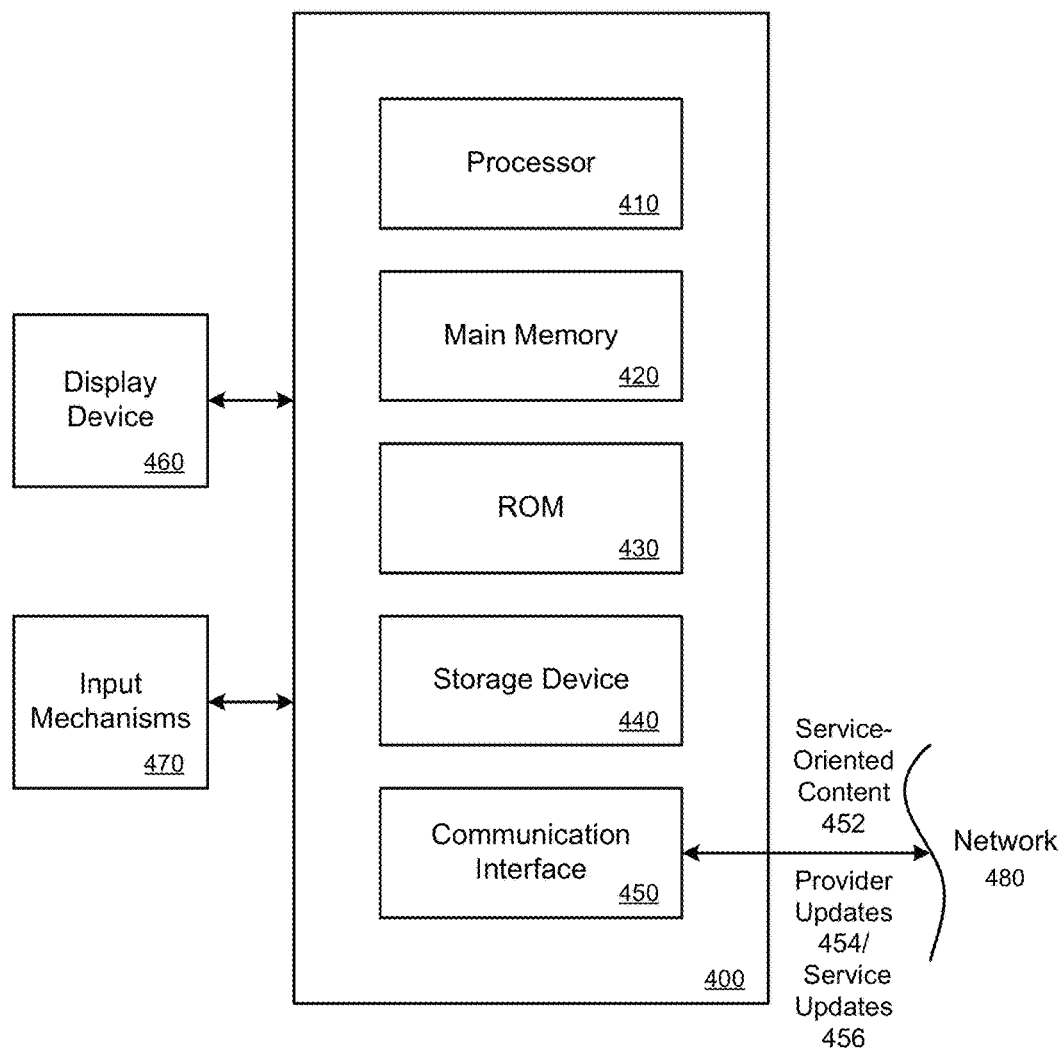
FIG. 4 is a block diagram that illustrates a computer system upon which examples described herein may be implemented.

FIG. 4 is a block diagram that illustrates a computer system upon which examples described herein may be implemented. For example, in the context of FIGS. 1A and 1B, the transport facilitation system 100 and content set generator 170 may be implemented using a computer system 400 such as described by FIG. 4. The transport facilitation system 100 and content set generator 170 may also be implemented using a combination of multiple computer systems 400 as described by FIG. 4.

In one implementation, computer system 400 includes processing resources 410, main memory 420, ROM 430, storage device 440, and communication interface 450. Computer system 400 includes at least one processor 410 for processing information. Computer system 400 also includes a main memory 420, such as a random access memory (RAM) or other dynamic storage device, for storing information and instructions to be executed by the processor 410. Main memory 420 also may be used for storing temporary variables or other intermediate information during execution of instructions to be executed by processor 410. Computer system 400 may also include a read only memory (ROM) 430 or other static storage device for storing static information and instructions for processor 410. A storage device 440, such as a magnetic disk or optical disk, is provided for storing information and instructions, such as instructions for implementing and operating the transport facilitation system 100 and/or the content set generator 170.

The communication interface 450 can enable the computer system 400 to communicate with one or more networks 480 (e.g., cellular network, wireless local area network, etc.) through use of the network link (wireless or wireline). Using the network link, the computer system 400 can communicate with one or more computing devices and/or one or more servers. In some variations, the computer system 400 can be configured to receive service-oriented content 452 from one or more content sources (e.g., managed and/or controlled by an administrator of the on-demand service) via the network link. The computer system 400 can also be configured to receive provider updates 454 from one or more computing devices (e.g., belonging to service providers) via the network link. The service-oriented content 452 and/or provider updates 454 can be processed by the processor 410 and can be stored in, for example, the storage device 440. The processor 410 can process the received data (and other data, such as historical data) in order to generate a set of targeted, and ranked, service-oriented content for each of the service providers associated with the on-demand service. The targeted content can be transmitted, as service updates 456, to the provider device(s) via the network 480.

Computer system 400 can also include a display device 460, such as a cathode ray tube (CRT), an LCD monitor, or a television set, for example, for displaying graphics and information to a user. An input mechanism 470, such as a keyboard that includes alphanumeric keys and other keys, can be coupled to computer system 400 for communicating information and command selections to processor 410. Other non-limiting, illustrative examples of input mechanisms 470 include a mouse, a trackball, touch-sensitive screen, or cursor direction keys for communicating direction information and command selections to processor 410 and for controlling cursor movement on display 460.

Examples described herein are related to the use of computer system 400 for implementing the techniques described herein. According to one example, those techniques are performed by computer system 400 in response to processor 410 executing one or more sequences of one or more instructions contained in main memory 420. Such instructions may be read into main memory 420 from another machine-readable medium, such as storage device 440. Execution of the sequences of instructions contained in main memory 420 causes processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
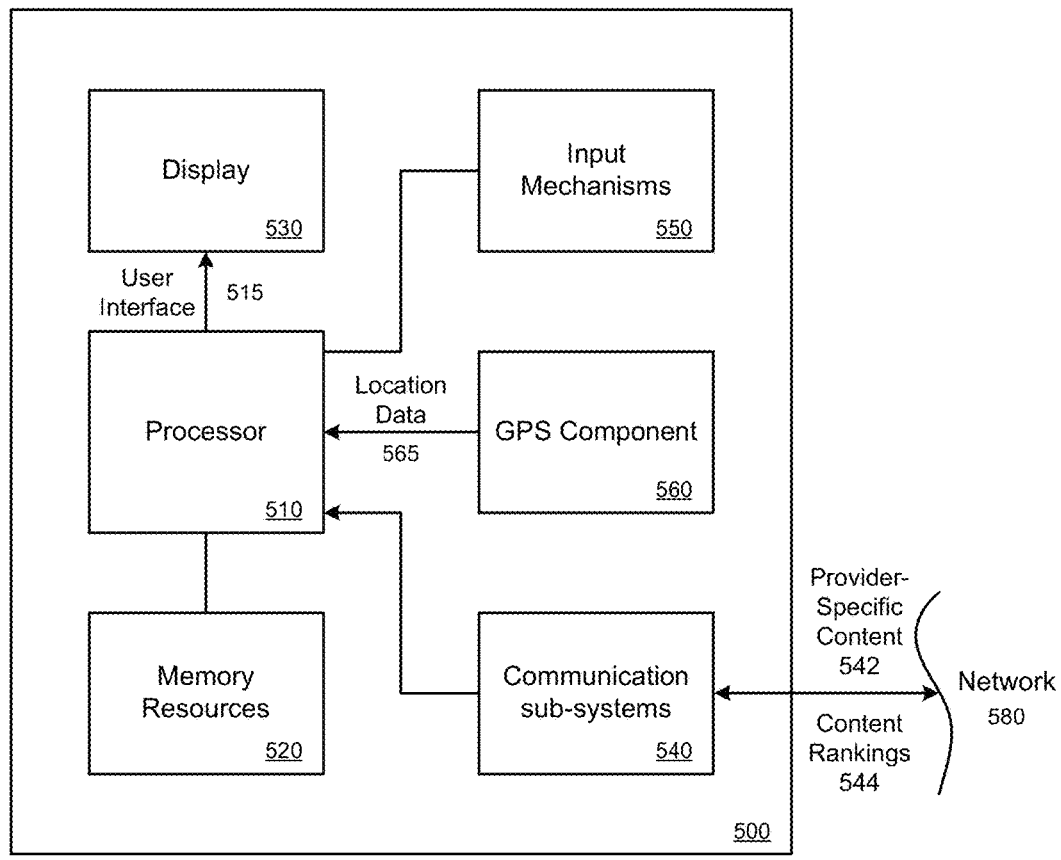
FIG. 5 is a block diagram that illustrates a mobile computing device upon which examples described herein may be implemented.

FIG. 5 is a block diagram that illustrates a mobile computing device upon which examples described herein may be implemented. In one example, a computing device 500 may correspond to a mobile computing device, such as a cellular device that is capable of telephony, messaging, and data services. Examples of such devices include smartphones, handsets or tablet devices for cellular carriers. Computing device 500 includes a processor 510, memory resources 520, a display device 530 (e.g., such as a touch-sensitive display device), one or more communication sub-systems 540 (including wireless communication sub-systems), input mechanisms 550 (e.g., an input mechanism can include or be part of the touch-sensitive display device), and one or more location detection mechanisms (e.g., GPS component) 560. In one example, at least one of the communication sub-systems 540 sends and receives cellular data over data channels and voice channels.

The processor 510 is configured with software and/or other logic to perform one or more processes, steps and other functions described with implementations, such as described by FIGS. 1A through 3D, and elsewhere in the application. Processor 510 is configured, with instructions and data stored in the memory resources 520, to operate a service application, for example, as described in FIGS. 1A through 3D. For example, instructions for operating the service application in order to display various user interfaces 515, such as described in FIGS. 3A-3D, can be stored in the memory resources 520 of the computing device 500. A requester or a service provider can operate the service application so that location data 565 can be determined by the GPS component 560. The location data 565 can provide the current location of the computing device 500 so that it can be used by the transport facilitation system 100 (as described in FIG. 1A) and/or the content set generator 170 (as described in FIG. 1B). The communication sub-systems 540 can receive provider-specific (e.g., targeted) content 542, generated by one or more content sources associated with the on-demand service, via a network from system 100. The communication sub-system 540 can also receive content rankings 544 in association with the received provider-specific content 542. The received data can be provided to the processor 510 for displaying the information as part of the user interface 515.

The processor 510 can provide content to the display 530 by executing instructions and/or applications that are stored in the memory resources 520. In some examples, user interfaces 515 can be provided by the processor 510, such as a user interface for the service application (e.g., as described above with respect to FIGS. 3A-3D). While FIG. 5 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the examples are not limited to those precise descriptions and illustrations. As such, many modifications and variations will be apparent to practitioners. Accordingly, it is contemplated that a particular feature described either individually or as part of an example can be combined with other individually described features, or parts of other examples, even if the other features and examples make no mentioned of the particular feature.

What is claimed is:

1. A transport facilitation system comprising:
one or more processors; and
one or more memory resources storing instructions that, when executed by the one or more processors, cause the one or more processors to:
manage a plurality of content items in a content database using one or more location tags and criteria tags for each content item, the plurality of content items to display on driver devices associated with an on-demand transportation service;
using stored driver data for a driver, filter the plurality of content items into a filtered subset of content items relevant to the driver;
monitor a dynamic location of the driver by receiving, over one or more networks, location data from a location-based resource of a driver device of the driver, the location data indicating the dynamic location of the driver as the driver operates throughout a given region;
continuously determine a degree of relevance for each of the filtered subset of content items based, at least in part, on (i) the dynamic location of the driver, and (ii) the one or more location tags and criteria tags of each of the filtered subset of content items;
generate a set of ranked content items for display on the driver device based on the determined degree of relevance for each of the filtered subset of content items;
provide, over the one or more networks to the driver device, the set of ranked content items for display on the driver device;
receive a driver status update indicating that the driver has performed a drop-off; and
in response to receiving the driver status update, automatically generate an earnings update content item providing earnings data for the drop-off;
wherein continuously determining the degree of relevance for each of the filtered subset of content items comprises determining, based on the driver status update, that the earnings update content item has a highest degree of relevance in relation to the set of ranked content items, and wherein providing the set of ranked content items for display on the driver device comprises providing the earnings update content item for prominent display in the set of ranked content items on the driver device based on the highest degree of relevance of the earnings update content item.

2. The transport facilitation system of claim 1, wherein the executed instructions cause the one or more processors to configure the set of ranked content items to display as a set of scrollable virtual cards on the driver device, the set of scrollable virtual cards comprising higher ranked content items being displayed more prominently than lower ranked content items.

3. The transport facilitation system of claim 1, wherein the driver data for filtering the plurality of content items indicates (i) the given region in which the driver operates, and (ii) a vehicle type of the driver.

4. The transport facilitation system of claim 1, wherein the executed instructions further cause the one or more processors to:
associate each of the plurality of content items in the content database with expiration conditions;
determine the expiration conditions for each respective content item in the set of ranked content items; and
when the expiration conditions for the respective content item are met, cause the respective content item to no longer be displayed on the driver device.

5. The transport facilitation system of claim 1, wherein the executed instructions further cause the one or more processors to:
receive, over the one or more networks, driver status updates from the driver device, the driver status updates indicating whether the driver is (i) available to service a pick-up request, (ii) currently servicing a pick-up request, or (iii) off-duty;
wherein the executed instructions cause the one or more processors to provide the set of ranked content items for display on the driver device in response to receiving a driver status update indicating that the driver is available or off-duty.

6. The transport facilitation system of claim 1, wherein the executed instructions cause the one or more processors to receive the location data from the driver device and provide the set of ranked content items to the driver device by way of an executing driver application that links the driver device to the transport facilitation system via the one or more networks.

7. A non-transitory computer-readable medium storing instructions that, when executed by one or more processors of a transport facilitation system, cause the one or more processors to:
manage a plurality of content items in a content database using one or more location tags and criteria tags for each content item, the plurality of content items to display on driver devices associated with an on-demand transportation service;
using stored driver data for a driver, filter the plurality of content items into a filtered subset of content items relevant to the driver;
monitor a dynamic location of the driver by receiving, over one or more networks, location data from a location-based resource of a driver device of the driver, the location data indicating the dynamic location of the driver as the driver operates throughout a given region;
continuously determine a degree of relevance for each of the filtered subset of content items based, at least in part, on (i) the dynamic location of the driver, and (ii) the one or more location tags and criteria tags of each of the filtered subset of content items;
generate a set of ranked content items for display on the driver device based on the determined degree of relevance for each of the filtered subset of content items;
provide, over the one or more networks to the driver device, the set of ranked content items for display on the driver device;
receive a driver status update indicating that the driver has performed a drop-off; and
in response to receiving the driver status update, automatically generate an earnings update content item providing earnings data for the drop-off;
wherein continuously determining the degree of relevance for each of the filtered subset of content items comprises determining, based on the driver status update, that the earnings update content item has a highest degree of relevance in relation to the set of ranked content items, and wherein providing the set of ranked content items for display on the driver device comprises providing the earnings update content item for prominent display in the set of ranked content items on the driver device based on the highest degree of relevance of the earnings update content item.

8. The non-transitory computer-readable medium of claim 7, wherein the executed instructions cause the one or more processors to configure the set of ranked content items to display as a set of scrollable virtual cards on the driver device, the set of scrollable virtual cards comprising higher ranked content items being displayed more prominently than lower ranked content items.

9. The non-transitory computer-readable medium of claim 7, wherein the driver data for filtering the plurality of content items indicates (i) the given region in which the driver operates, and (ii) a vehicle type of the driver.

10. The non-transitory computer-readable medium of claim 7, wherein the executed instructions further cause the one or more processors to:
associate each of the plurality of content items in the content database with expiration conditions;
determine the expiration conditions for each respective content item in the set of ranked content items; and
when the expiration conditions for the respective content item are met, cause the respective content item to no longer be displayed on the driver device.

11. The non-transitory computer-readable medium of claim 7, wherein the executed instructions further cause the one or more processors to:
receive, over the one or more networks, driver status updates from the driver device, the driver status updates indicating whether the driver is (i) available to service a pick-up request, (ii) currently servicing a pick-up request, or (iii) off-duty;
wherein the executed instructions cause the one or more processors to provide the set of ranked content items for display on the driver device in response to receiving a driver status update indicating that the driver is available or off-duty.

12. The non-transitory computer-readable medium of claim 7, wherein the executed instructions cause the one or more processors to receive the location data from the driver device and provide the set of ranked content items to the driver device by way of an executing driver application that links the driver device to the transport facilitation system via the one or more networks.

13. A computer-implemented method of providing content to driver devices in connection with a transportation arrangement service, the method being performed by one or more processors of a transport facilitation system and comprising:
managing a plurality of content items in a content database using one or more location tags and criteria tags for each content item, the plurality of content items to display on driver devices associated with an on-demand transportation service;
using stored driver data for a driver, filtering the plurality of content items into a filtered subset of content items relevant to the driver;
monitoring a dynamic location of the driver by receiving, over one or more networks, location data from a location-based resource of a driver device of the driver, the location data indicating the dynamic location of the driver as the driver operates throughout a given region;

continuously determining a degree of relevance for each of the filtered subset of content items based, at least in part, on (i) the dynamic location of the driver, and (ii) the one or more location tags and criteria tags of each of the filtered subset of content items;

generating a set of ranked content items for display on the driver device based on the determined degree of relevance for each of the filtered subset of content items;

providing, over the one or more networks to the driver device, the set of ranked content items for display on the driver device;

receiving a driver status update indicating that the driver has performed a drop-off; and in response to receiving the driver status update, automatically generating an earnings update content item providing earnings data for the drop-off;

wherein continuously determining the degree of relevance for each of the filtered subset of content items comprises determining, based on the driver status update, that the earnings update content item has a highest degree of relevance in relation to the set of ranked content items, and wherein providing the set of ranked content items for display on the driver device comprises providing the earnings update content item for prominent display in the set of ranked content items on the driver device based on the highest degree of relevance of the earnings update content item.

14. The computer-implemented method of claim 13, wherein the one or more processors configure the set of ranked content items to display as a set of scrollable virtual cards on the driver device, the set of scrollable virtual cards comprising higher ranked content items being displayed more prominently than lower ranked content items.

15. The computer-implemented method of claim 13, further comprising:

associating each of the plurality of content items in the content database with expiration conditions;

determining the expiration conditions for each respective content item in the set of ranked content items; and when the expiration conditions for the respective content item are met, removing the respective content item from display on the driver device.

* * * * *